(12) United States Patent
Rokhlin et al.

(10) Patent No.: US 12,481,250 B1
(45) Date of Patent: Nov. 25, 2025

(54) WATCH REFURBISHING DEVICES AND METHODS

(71) Applicant: SwissWatchExpo, Inc., Atlanta, GA (US)

(72) Inventors: Jake Rokhlin, Alpharetta, GA (US); William Gonzalez, Atlanta, GA (US); Gary Zape, Gibsonville, NC (US)

(73) Assignee: SwissWatchExpo, Inc., Atlanta, GA (US)

( * ) Notice: Subject to any disclaimer, the term of this patent is extended or adjusted under 35 U.S.C. 154(b) by 0 days.

(21) Appl. No.: 19/233,132

(22) Filed: Jun. 10, 2025

(51) Int. Cl.
*G04D 3/02* (2006.01)
*B24B 21/00* (2006.01)
(Continued)

(52) U.S. Cl.
CPC ......... *G04D 3/0209* (2013.01); *B24B 21/002* (2013.01); *B24B 27/0076* (2013.01);
(Continued)

(58) Field of Classification Search
CPC ............ B24B 27/0076; B24B 27/0023; B24B 21/008; B24B 41/005; B24B 41/02;
(Continued)

(56) References Cited

U.S. PATENT DOCUMENTS

| 369,866 A | 9/1887 | Marsh |
|---|---|---|
| 1,918,668 A | 7/1933 | Reusser |

(Continued)

FOREIGN PATENT DOCUMENTS

| CN | 209408190 U | 9/2019 |
|---|---|---|
| CN | 215036172 U | 12/2021 |

(Continued)

OTHER PUBLICATIONS

Belt Sander by Central Machinery, https://www.harborfreight.com/1-in-x-30-in-belt-sander-58359.html?utm_source=google&utm_medium=cpc&utm&ca . . . , accessed Jun. 6, 2025.

(Continued)

*Primary Examiner* — Joel D Crandall
(74) *Attorney, Agent, or Firm* — Perilla Knox & Hildebrandt LLP

(57) ABSTRACT

At least one resurfacing system and at least one adjustment guide system for positioning a chuck holding a watch component relative to the resurfacing system. In example embodiments, the adjustment guide system includes one guide rail providing linear offset/distance and angular adjustment and guidance, or two perpendicular guide rails providing linear offset/distance and lateral position adjustment and guidance. Some embodiments include first and second resurfacing systems and a common rotary drive system that drives both the first and second resurfacing systems. The first resurfacing system can be a linear belt resurfacing system and the second resurfacing system can be a rotary disc resurfacing system. Some embodiments including the rotary disc resurfacing system have a metal rotary mounting disc driven by the drive system and a replaceable magnetic resurfacing disc that magnetically adheres to the rotary disc. Also disclosed is a method of resurfacing watches using these watch resurfacing devices.

20 Claims, 20 Drawing Sheets

(51) Int. Cl.
*B24B 27/00* (2006.01)
*B24B 41/06* (2012.01)
*G04D 3/00* (2006.01)

(52) U.S. Cl.
CPC ........... *B24B 41/06* (2013.01); *G04D 3/0053* (2013.01); *G04D 3/0064* (2013.01); *G04D 3/0097* (2013.01)

(58) Field of Classification Search
CPC .... B24B 41/06; G04D 3/0209; G04D 3/0053; G04D 3/0064; G04D 3/0097
See application file for complete search history.

(56) References Cited

U.S. PATENT DOCUMENTS

| | | | |
|---|---|---|---|
| 2,671,295 A | | 3/1954 | Sharp et al. |
| 2,691,255 A | * | 10/1954 | Blazek .................. B24B 19/28 451/305 |
| 4,065,886 A | * | 1/1978 | Harwood ............... B24B 23/02 451/361 |
| 4,167,836 A | | 9/1979 | Tadao |
| 4,305,231 A | * | 12/1981 | Rasmussen ......... B24B 27/0076 451/65 |
| 4,924,633 A | * | 5/1990 | Hock ..................... B24B 21/18 D15/124 |
| 5,070,653 A | * | 12/1991 | Amundsen ............. B24B 15/04 451/283 |
| 6,089,963 A | | 7/2000 | Wiand et al. |
| 6,394,887 B1 | | 5/2002 | Edinger |
| 7,480,970 B2 | * | 1/2009 | Meyer ..................... B44B 3/04 82/132 |
| 8,607,399 B2 | | 12/2013 | Umbrell |
| 9,844,815 B2 | * | 12/2017 | Mandler ............... B23Q 39/04 |
| 10,661,407 B2 | | 5/2020 | Guido |
| 12,005,542 B2 | | 6/2024 | Guido |
| 2002/0098788 A1 | | 7/2002 | Edinger |
| 2005/0153640 A1 | | 7/2005 | Stein |
| 2007/0094857 A1 | * | 5/2007 | Savoie ................... B24B 13/00 29/27 C |
| 2016/0221148 A1 | | 8/2016 | Dannoux |
| 2019/0240798 A1 | | 8/2019 | Valentini |
| 2021/0308824 A1 | | 10/2021 | Valentini |
| 2024/0351160 A1 | | 10/2024 | Valentini |

FOREIGN PATENT DOCUMENTS

| | | | | |
|---|---|---|---|---|
| DE | 4412417 A1 | * | 10/1994 | ............ B24B 29/02 |
| EP | 2366497 A1 | * | 9/2011 | ......... B24B 27/0076 |

OTHER PUBLICATIONS

Greiner Vibrograf Hand Piece SL2 (LM1), https://www.greinervibrograf.ch/en/Accessories-LM1/Hand-piece-SL2-%2528LM1%2529.htm, accessed Apr. 16, 2025.

Kirman S.L. "LM1 Stoner".

Kirman S.L. "Lapidadora LM1 Stoner", https://www.bing.com/images/search?view=detailV2&ccid=%2Bwt%2B4R&id=4EF13A01FC24A54BAAEA9ACF9B146658BCC2320D6 . . . , accessed Apr. 16, 2025.

\* cited by examiner

WATCH REFURBISHING DEVICES AND METHODS

TECHNICAL FIELD

This invention relates generally to refurbishing watches, and more particularly to devices and methods for resurfacing components of watches.

BACKGROUND

When refurbishing fine watches, it is often necessary to restore scratched and/or otherwise damaged components to like-new condition. To do this, it is common to utilize tools to polish and finish the surfaces of scratched metal bezels and other metallic components. Different models and brands of watches have bezels with different geometries, with each bezel having multiple surfaces with each surface oriented at a different angle. Similarly, other surfaces of other metal components of watches sometimes require polishing, such as the case, lugs, crown, or another component.

The use of conventional devices and techniques to polish the surfaces of metal parts of watches is generally rather time-consuming and technically challenging. This is in significant part because of the multiple different orientations/angles of the multiple surfaces of the watch components. And this is particularly a problem when refurbishing fine watches for which precision polishing and finishing, with consistent and high-quality results, is required. Accordingly, improvements in watch refurbishing are desired.

SUMMARY

Generally described, the present invention relates to watch refurbishing devices and methods. The watch refurbishing devices include at least one resurfacing system and at least one adjustment guide system for positioning a chuck holding a watch component relative to the resurfacing system. In example embodiments, the adjustment guide system includes one guide rail providing linear offset/distance and angular adjustment and guidance, or two perpendicular guide rails providing linear offset/distance and linear lateral position adjustment and guidance. Some embodiments include first and second resurfacing systems and a common rotary drive system that drives both the first and second resurfacing systems. The first resurfacing system can be a linear belt resurfacing system and the second resurfacing system can be a rotary disc resurfacing system. Some embodiments including the rotary disc resurfacing system have a rotary metal mounting disc driven by the drive system and a replaceable magnetic abrasive disc that magnetically adheres to the metal mounting disc. Also disclosed is a method of resurfacing watches using these and similar watch resurfacing devices.

The specific techniques and structures employed to improve over the drawbacks of the prior art and accomplish the advantages described herein will become apparent from the following detailed description of example embodiments and the appended drawings and claims.

DETAILED DESCRIPTION OF EXAMPLE EMBODIMENTS

Figure 1:
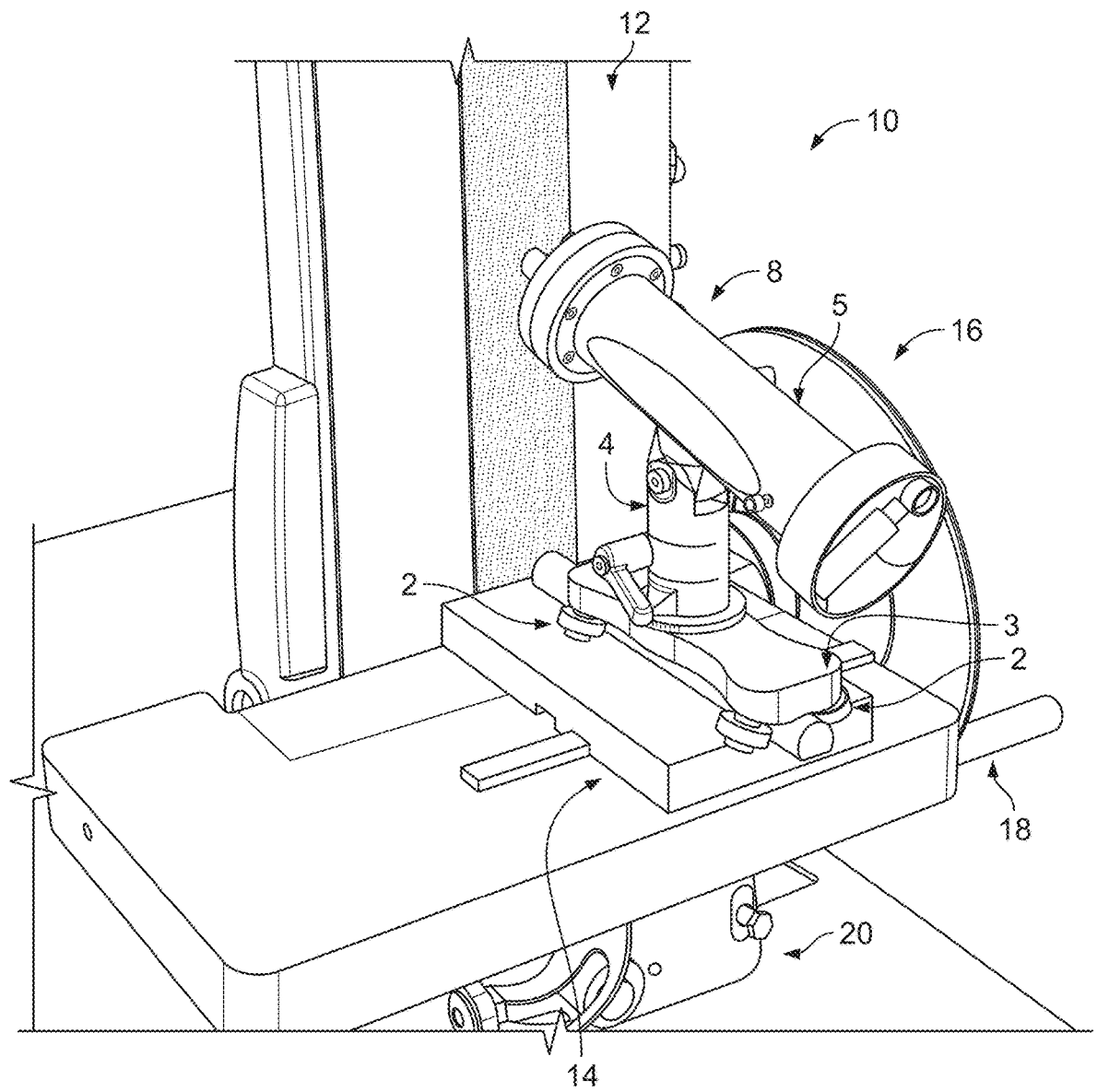
FIG. 1 is a perspective view of a portion of a watch resurfacing device according to an example embodiment, showing a first linear belt resurfacing system, a first adjustment guide system that is shown positioning a chuck (for holding a watch component, not shown) relative to the first resurfacing system, a second rotary disc resurfacing system, a second adjustment guide system that can be used for positioning the chuck holding the watch component relative to the second resurfacing system, and a common rotary drive system that drives both the first and second resurfacing systems.

The present invention relates to watch refurbishing devices and methods that enable precision resurfacing of components of watches. As used herein, resurfacing means abrading, sanding, polishing, and/or finishing surfaces of watch components, including the bezel, lugs, case, crown, and/or other metal exterior components of watches. While devices and methods are described herein in the context of resurfacing components of used watches, additionally or alternatively they can be used for resurfacing components of new watches. Also, while the herein-described devices and methods are intended for resurfacing components of fine watches (e.g., Swiss-made luxury watches), additionally or alternatively they can be used for resurfacing components of watches of standard, lower, or other quality. Further, while the herein-described devices and methods are intended for resurfacing components of wristwatches, additionally or alternatively they can be used for resurfacing components of pocket watches, stop clocks, and/or other types of portable time-keeping devices (herein collectively referred to as watches).

Referring now to the drawings, FIGS. 1-24 show a watch resurfacing device 10 according to an example embodiment. The watch resurfacing device 10 includes a first linear belt resurfacing system 12, a first adjustment guide system 14 for positioning a chuck 8 holding a watch component 6 relative to the first resurfacing system, a second rotary disc resurfacing system 16, a second adjustment guide system 18 for positioning the chuck holding the watch component relative to the second resurfacing system, and a common rotary drive system 20 that drives both the first and second resurfacing systems. These systems and their components can be made of conventional materials (e.g., primarily metal) using conventional fabrication techniques and equipment.

Other embodiments include the same or similar first linear belt resurfacing and adjustment guide systems by themselves (with a drive system but without the second rotary disc resurfacing and adjustment guide systems), and the same or similar second rotary disc resurfacing and adjustment guide systems by themselves (with a drive system but without the first linear belt resurfacing and adjustment guide systems). Still other embodiments include the same or similar first linear belt resurfacing and adjustment guide systems, and the same or similar second rotary disc resurfacing and adjustment guide systems by themselves, with respective first and second drive systems for independently driving the first and second resurfacing systems. Yet other embodiments include first and second resurfacing and adjustment guide systems, of the same, similar, or other types as described herein (e.g., two belt resurfacing systems or two disc resurfacing systems), and a common rotary drive system that drives both those first and second resurfacing systems. Some embodiments include three or four resurfacing and adjustment guide systems, of the same, similar, or other types as described herein, and a common rotary drive system that drives them all. Other embodiments include a replaceable magnetic resurfacing disc that is removably mountable on a metal mounting disc of a rotary disc resurfacing system of the same, similar, or other types as described herein.

Figure 2:
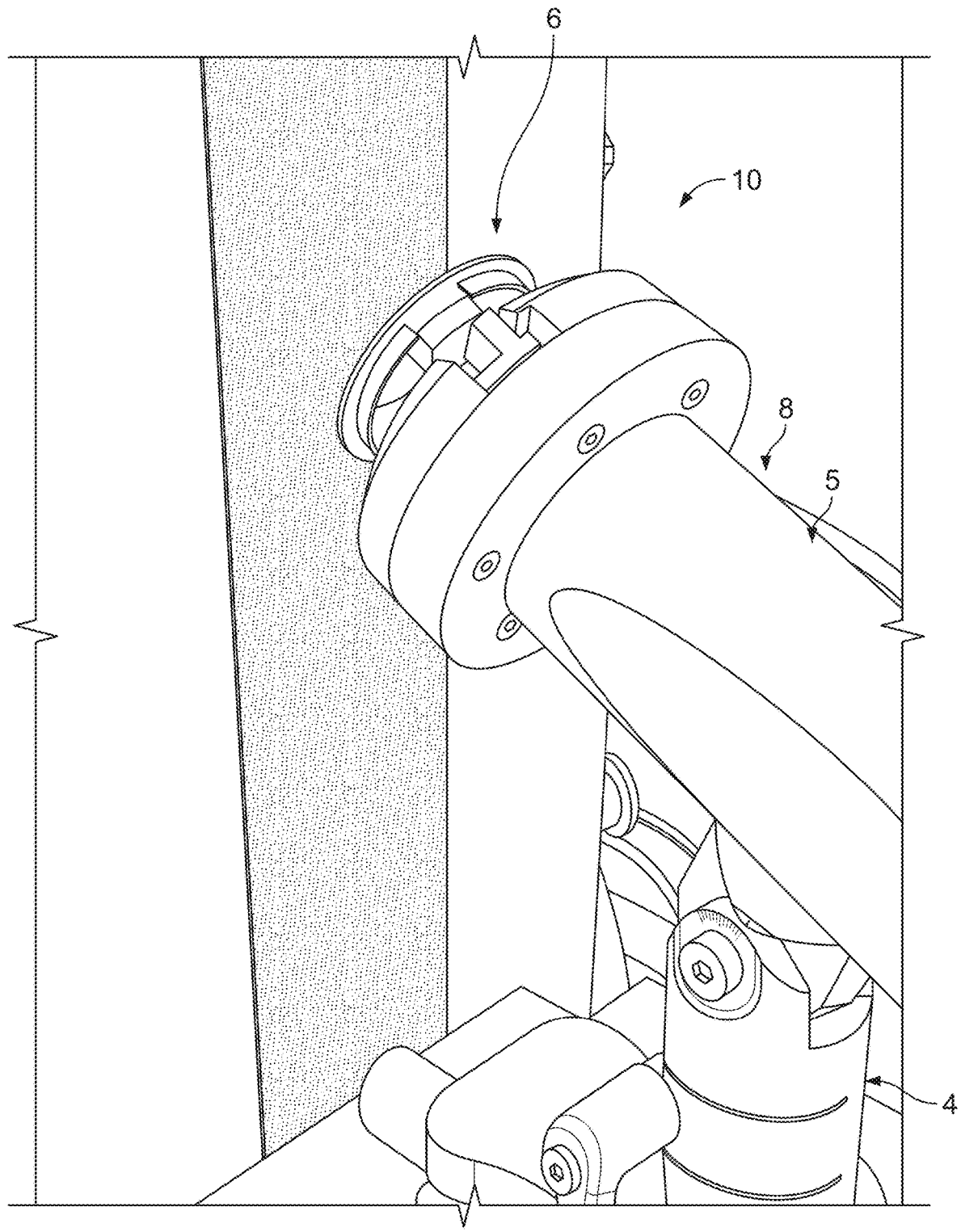
FIG. 2 shows a detail view of a portion of the watch resurfacing device of FIG. 1, with the chuck shown holding the watch component relative to the first linear belt resurfacing system.
Figure 3:
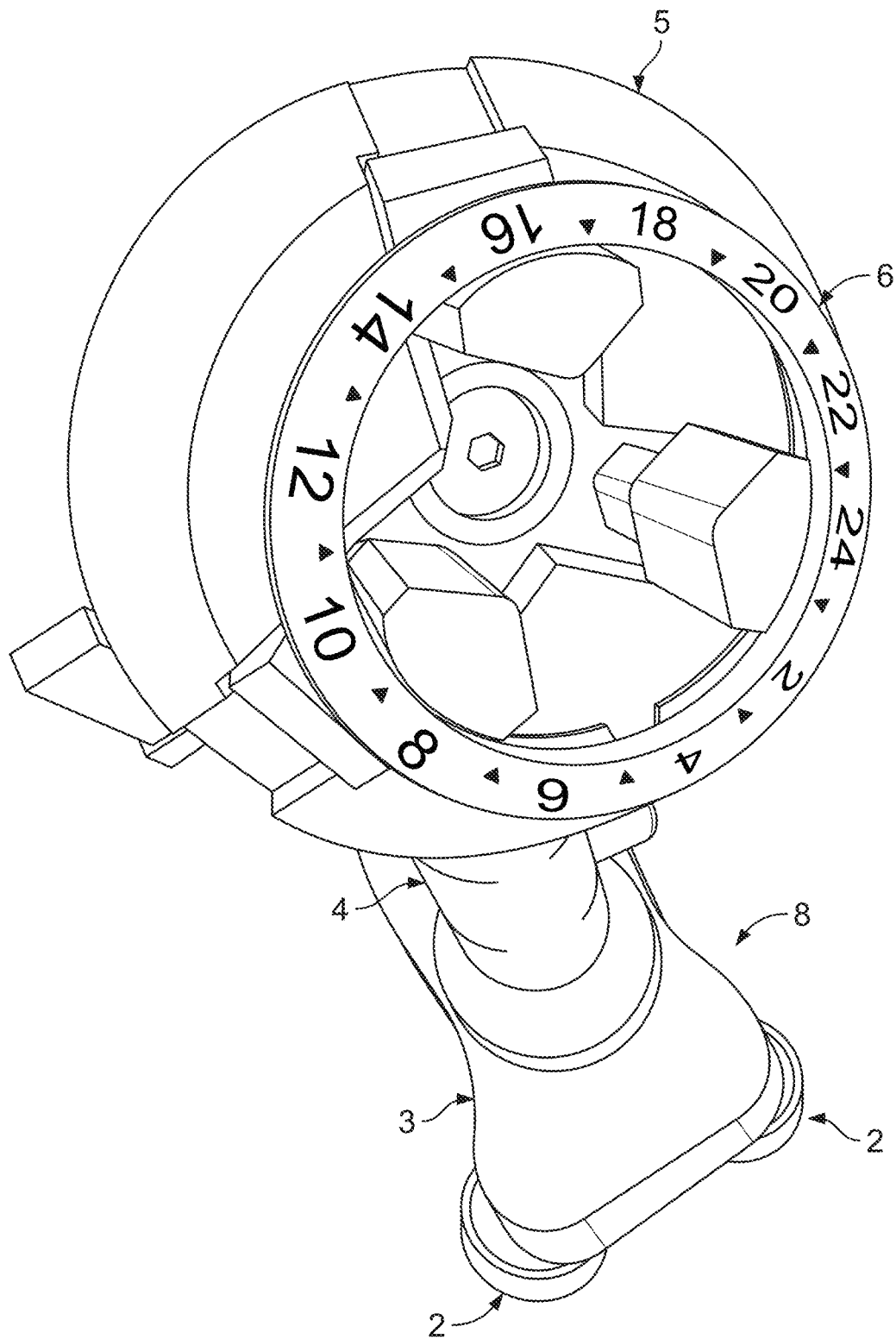
FIG. 3 is a perspective view of the chuck holding the watch component.

Referring particularly to FIGS. 1-3, the chuck 8 can be provided with the watch resurfacing device 10, or it can be provided separately for use with the watch resurfacing device 10, in all of the embodiments described herein. The chuck 8 can be of a conventional type for holding watch components during resurfacing. As depicted, for example, the chuck 8 can include an arm 5 to which the watch component (a bezel is depicted) 6 removably mounts, an upright support 4 to which the arm is adjustably mounted, a base 3 to which the upright support is adjustably mounted, and a plurality of feet (e.g., two longitudinally spaced sets/pairs of two opposing rollers). A suitable example chuck 8 is commercially available from Greiner Vibrograg AG (Langenthal, Switzerland) as model Hand Piece SL2 (LM1).

The various features of the watch resurfacing device 10 and its method of use described below, individually and/or in combination, provide for improved adjustability and efficiency in watch refurbishing. Use of the various embodiments of the watch resurfacing device 10 and related methods of use enable a technician to precisely present a particular bezel face (or other watch component 6) at a precise orientation, with a high degree of adjustability, to an abrasive surface (of a resurfacing system 12 or 16) for resurfacing. The technician can load the watch component 6 into the chuck 8, position the chuck with the watch component guided into in a precise position by the adjustment guide system 14 or 18 where it contacts the abrasive surface at a precisely controlled angle. The features of the watch resurfacing device 10 and related methods of use provide for a wide range and ease/speed of adjustment, precisely and accurately, of the watch component position and orientation.

Figure 4:
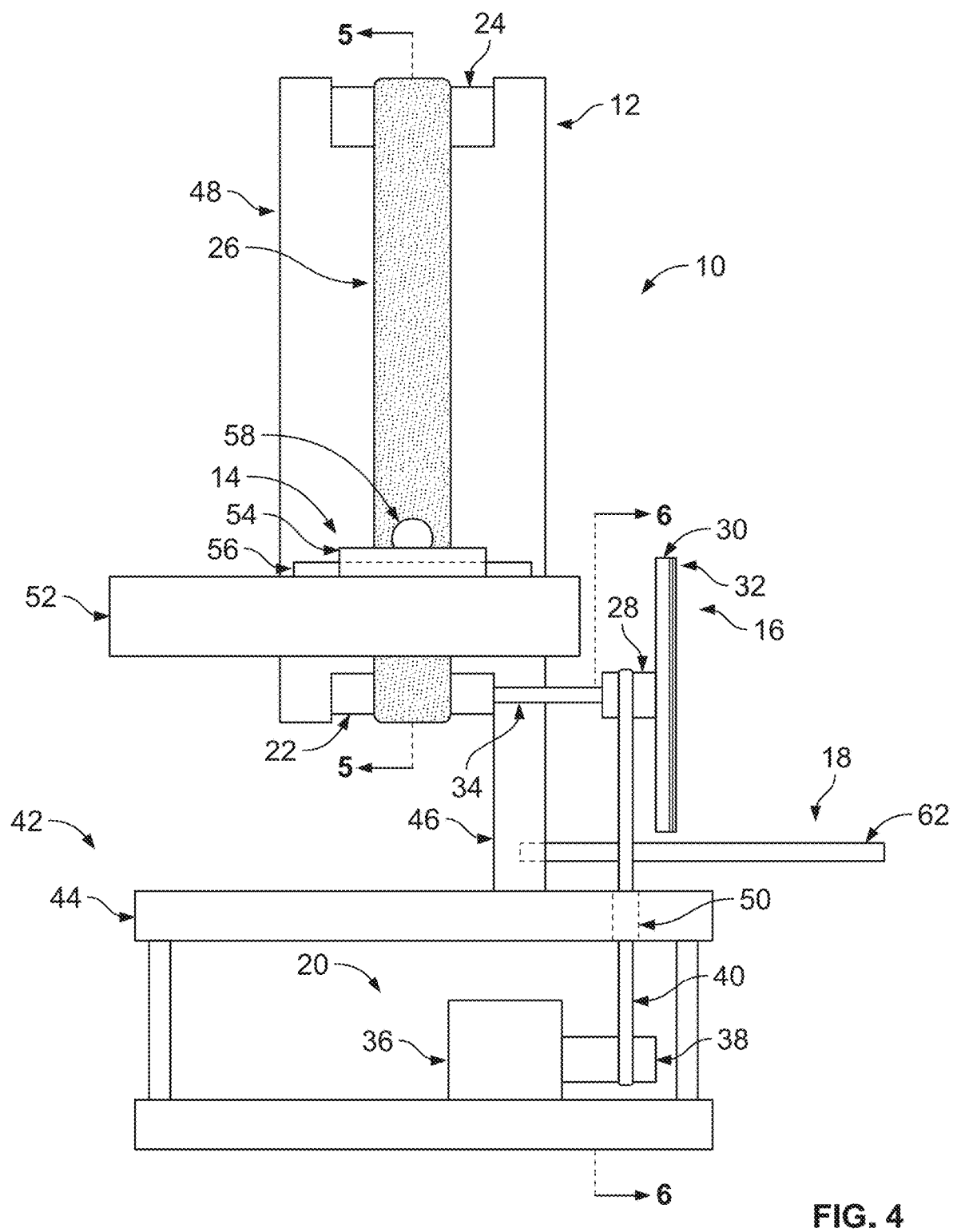
FIG. 4 is a schematic view of the watch resurfacing device 10 of FIG. 1, shown without the chuck and watch component.
Figure 5:
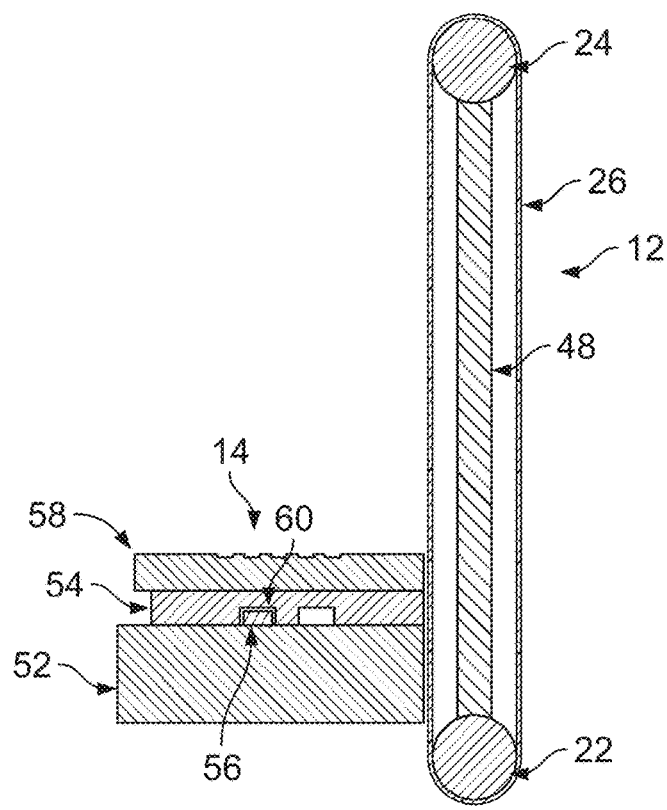
FIG. 5 is a cross-sectional view of the first linear belt resurfacing system and the first adjustment guide system of the watch resurfacing device 10 of FIG. 4, taken at line 5-5 of FIG. 4.
Figure 6:
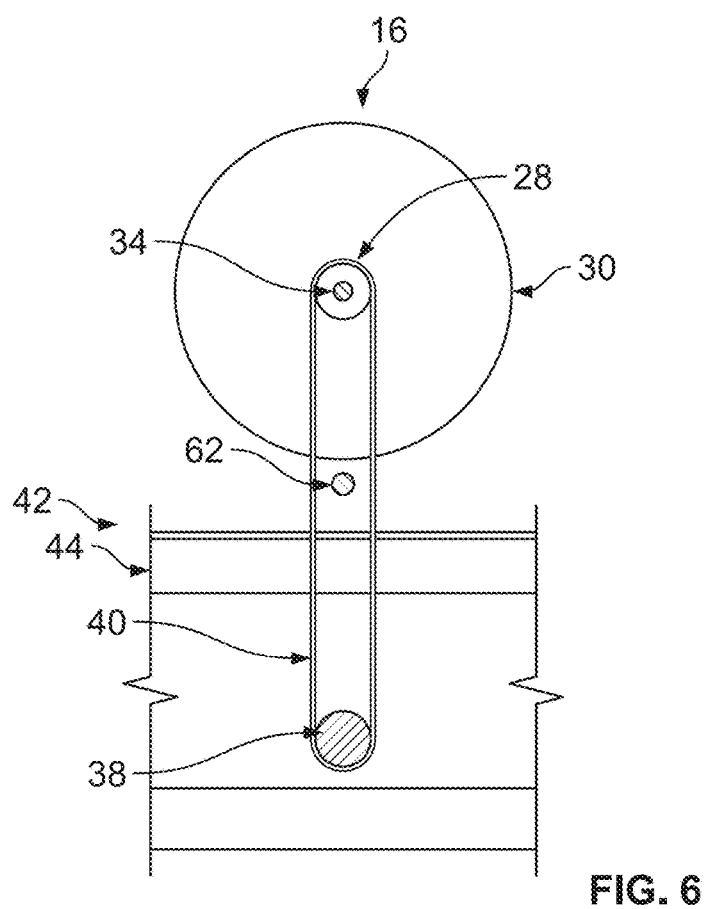
FIG. 6 is a cross-sectional view of the second rotary disc resurfacing system and the second adjustment guide system of the watch resurfacing device of FIG. 4, taken at line 6-6 of FIG. 4.
Figure 7:
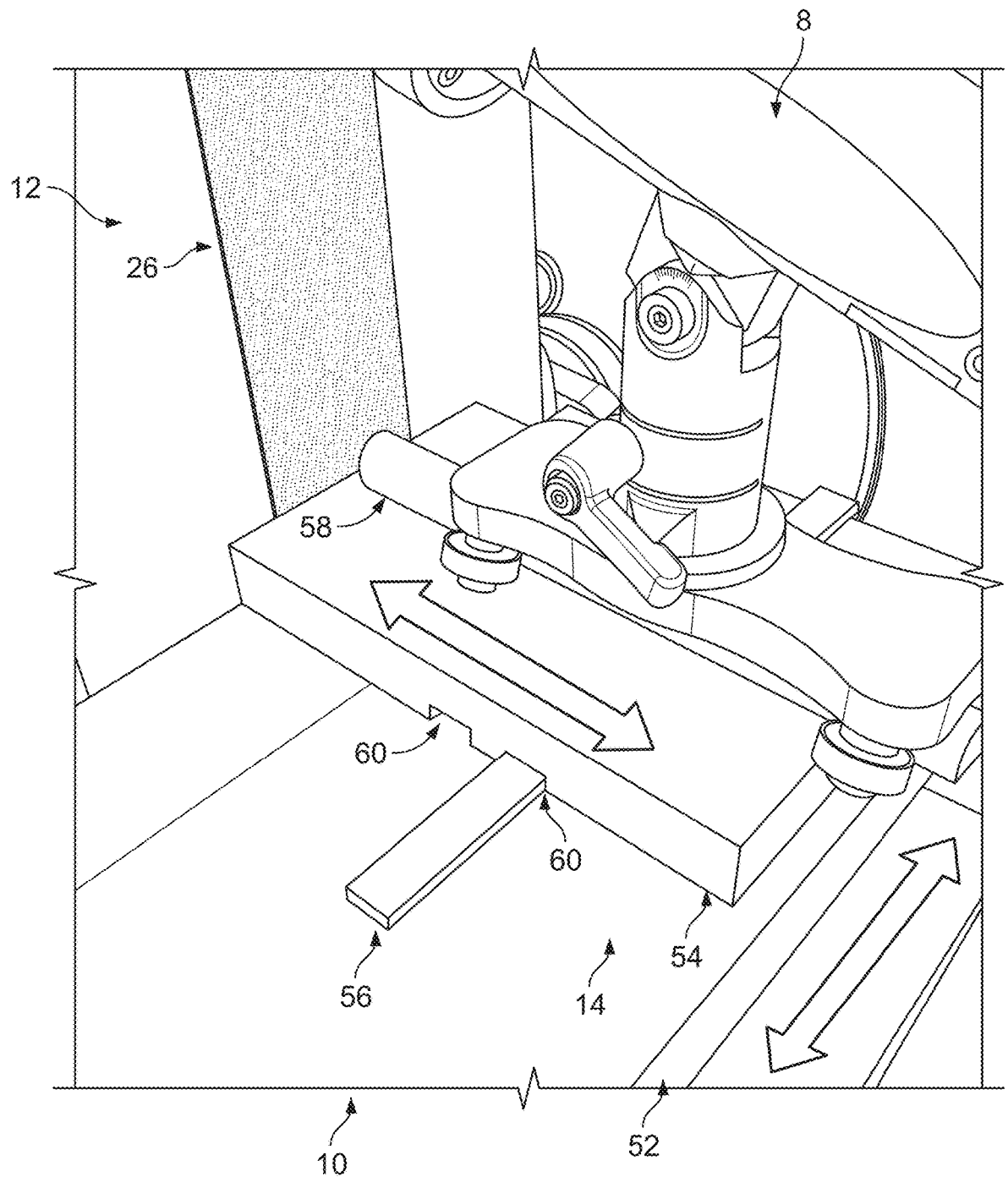
FIG. 7 is a perspective detail view of a portion of the watch resurfacing device of FIG. 1, showing portions of the first linear belt resurfacing system and the first adjustment guide system with the motion arrows indicating offset and lateral position adjustment and guidance provided by the first adjustment guide system.
Figure 8:
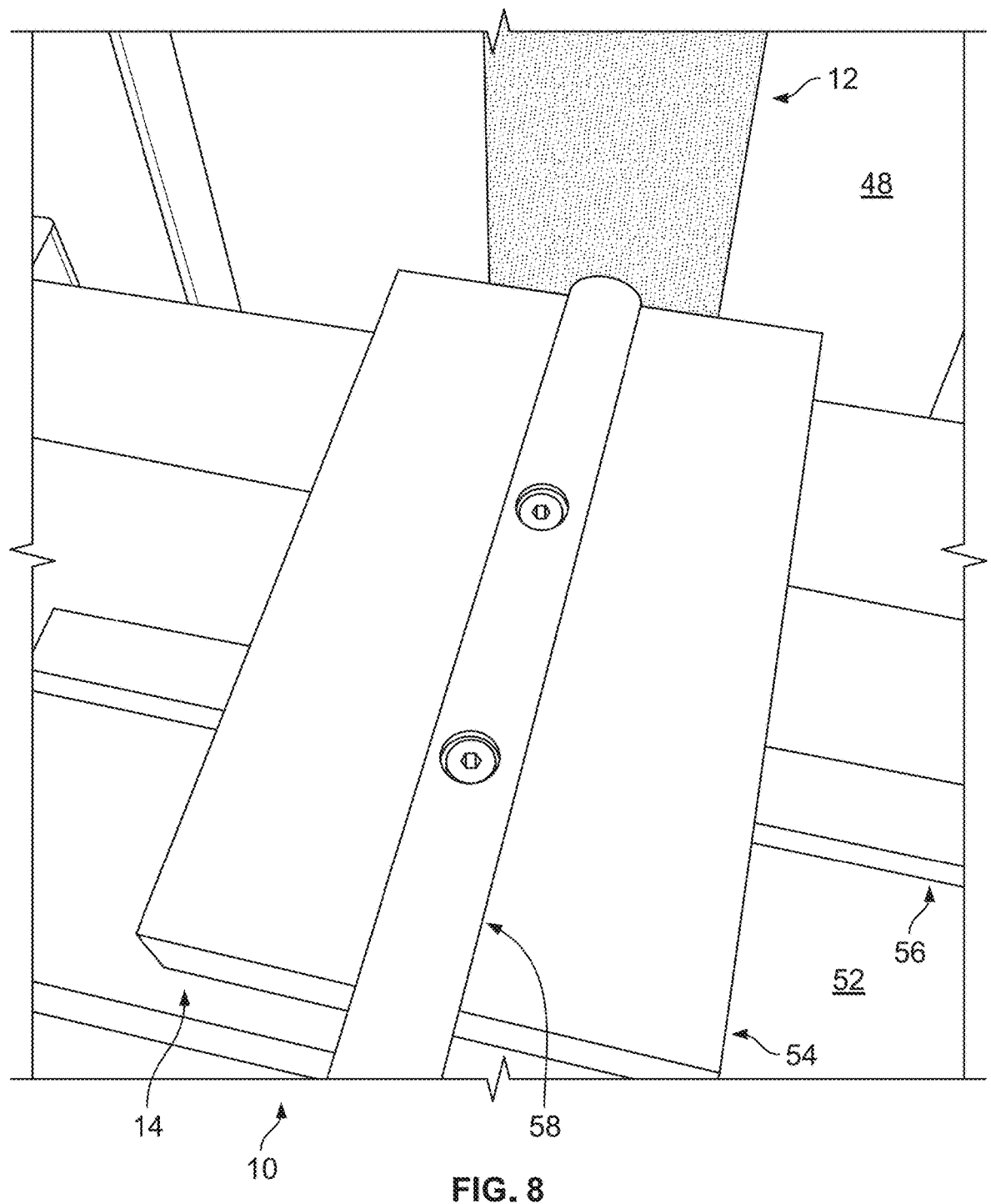
FIG. 8 is a perspective detail view of a portion of the first adjustment guide system of FIG. 7, with the chuck and watch component removed to show features of the first adjustment guide system.
Figure 9:
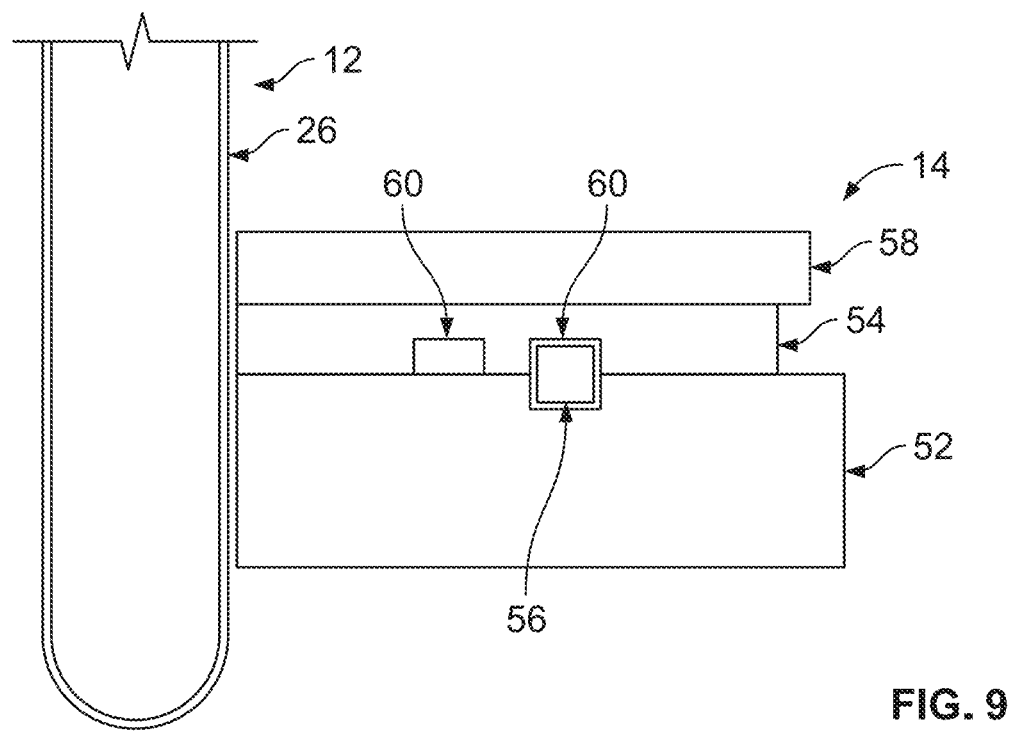
FIG. 9 is a side schematic view of the first adjustment guide system of FIG. 7.
Figure 10:
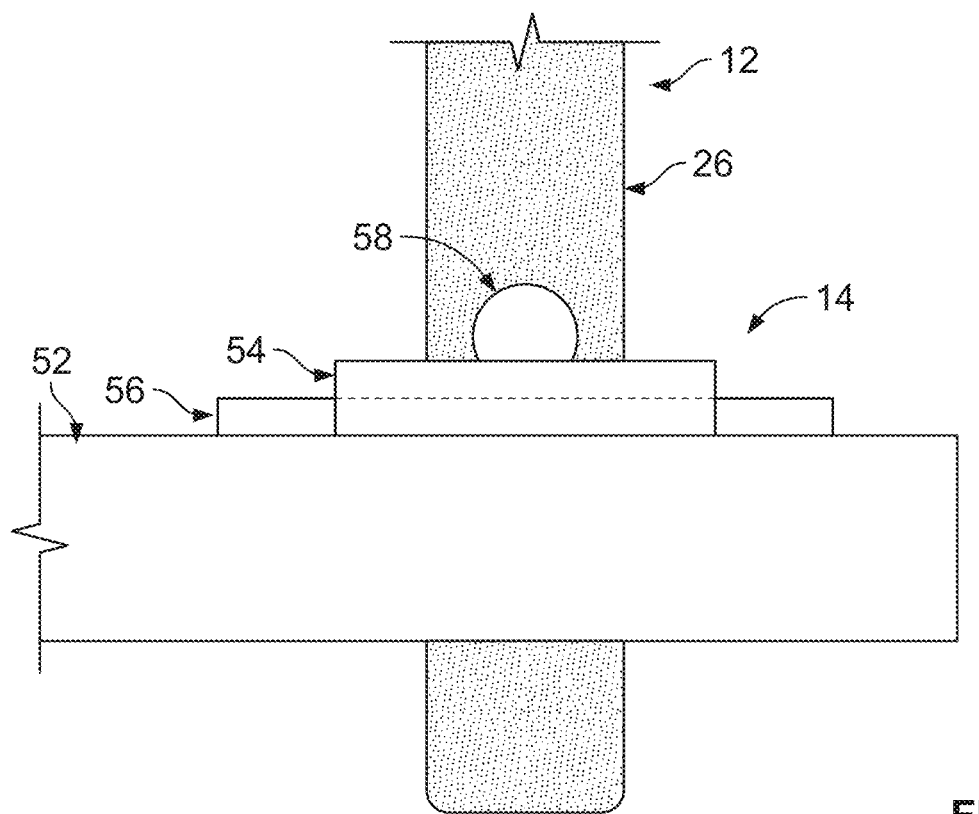
FIG. 10 is a front schematic view of the first adjustment guide system of FIG. 7.
Figure 11:
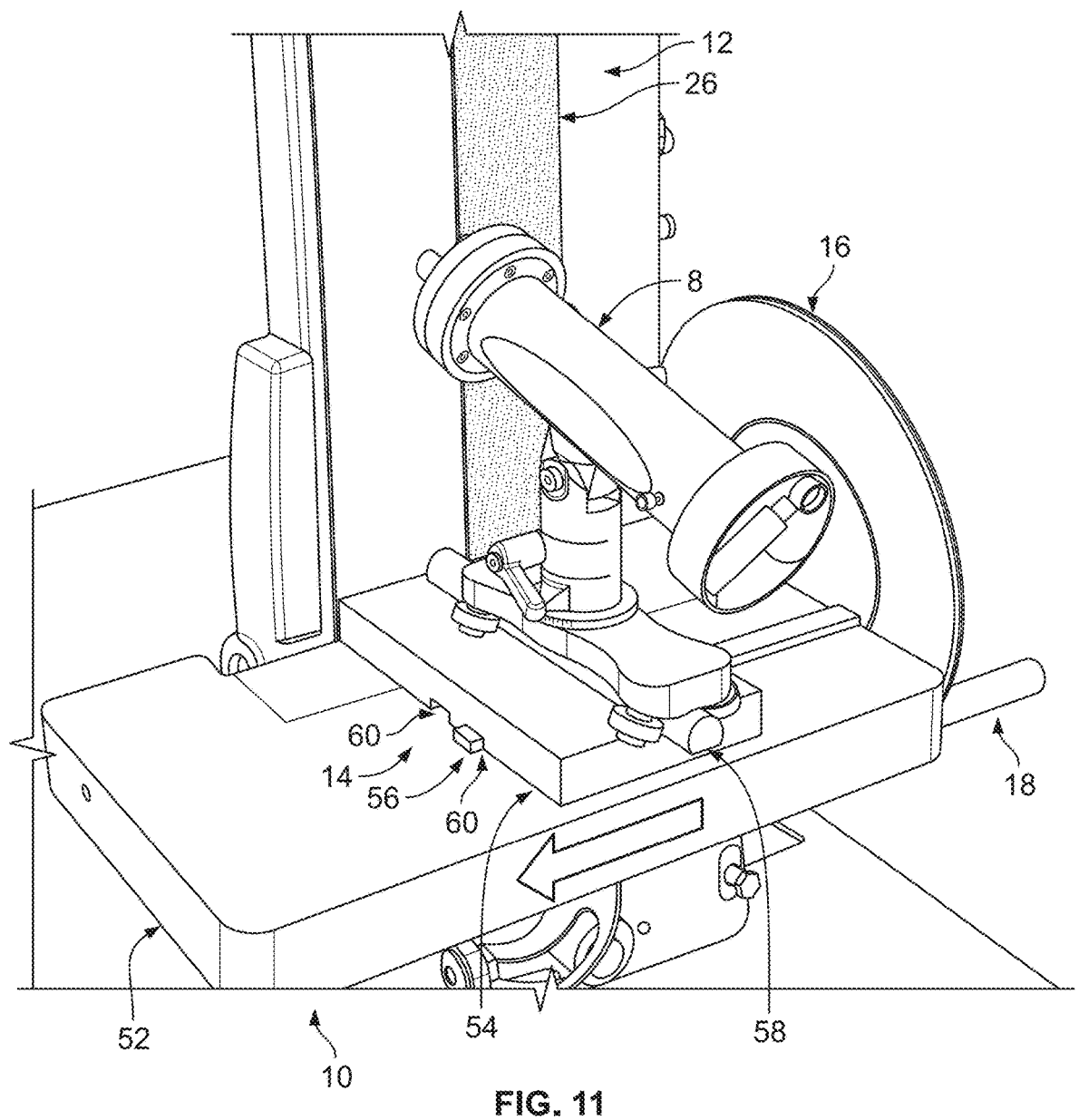
FIG. 11 is a perspective detail view of the first linear belt resurfacing system and the first adjustment guide system of FIG. 1, with the first adjustment guide system in use laterally repositioning the chuck, as indicated by the directional arrow.
Figure 12:
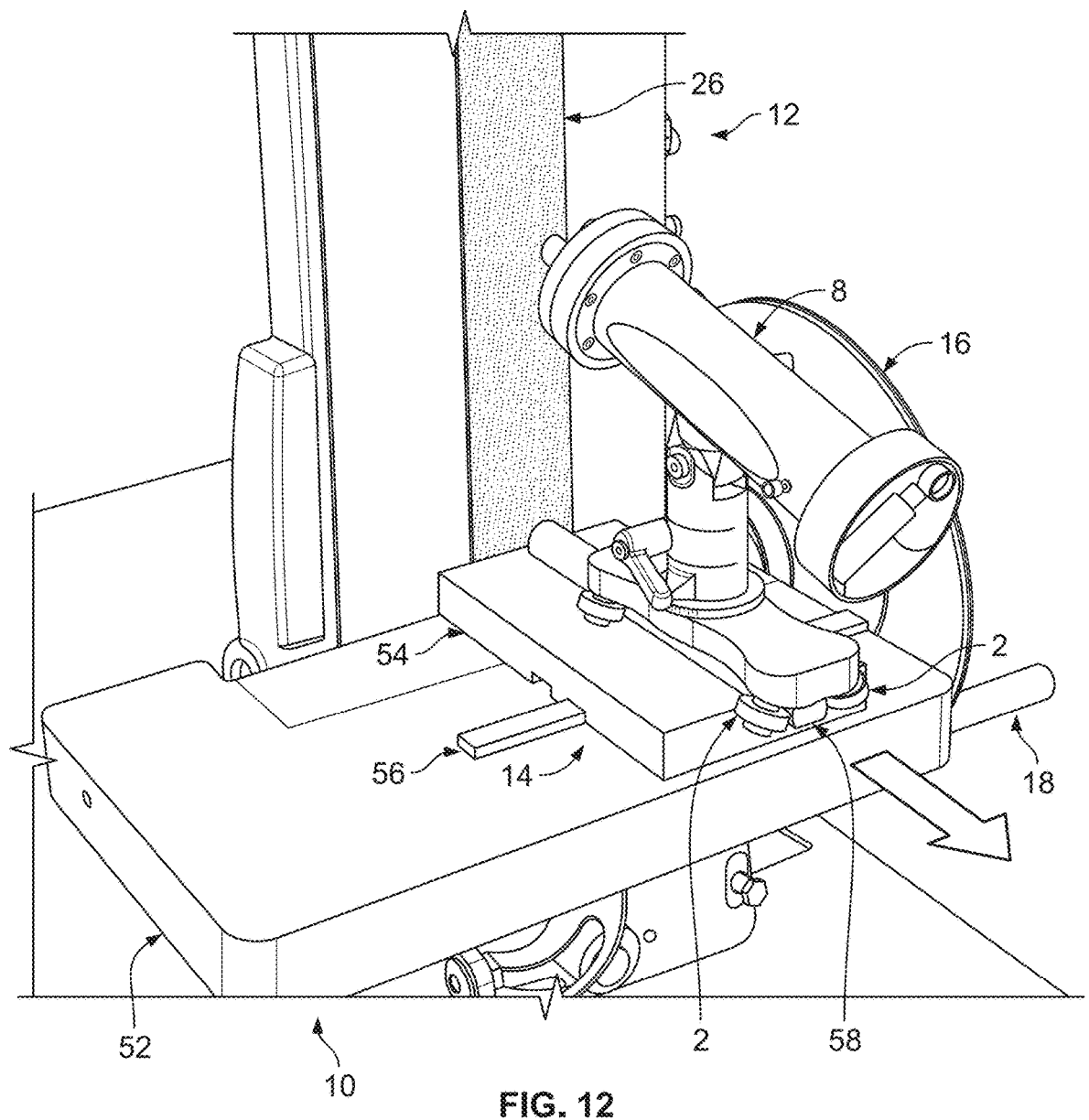
FIG. 12 shows the first linear belt resurfacing system and the first adjustment guide system of FIG. 11, showing the first adjustment guide system in use offset/separation repositioning the chuck, as indicated by the directional arrow.
Figure 13:
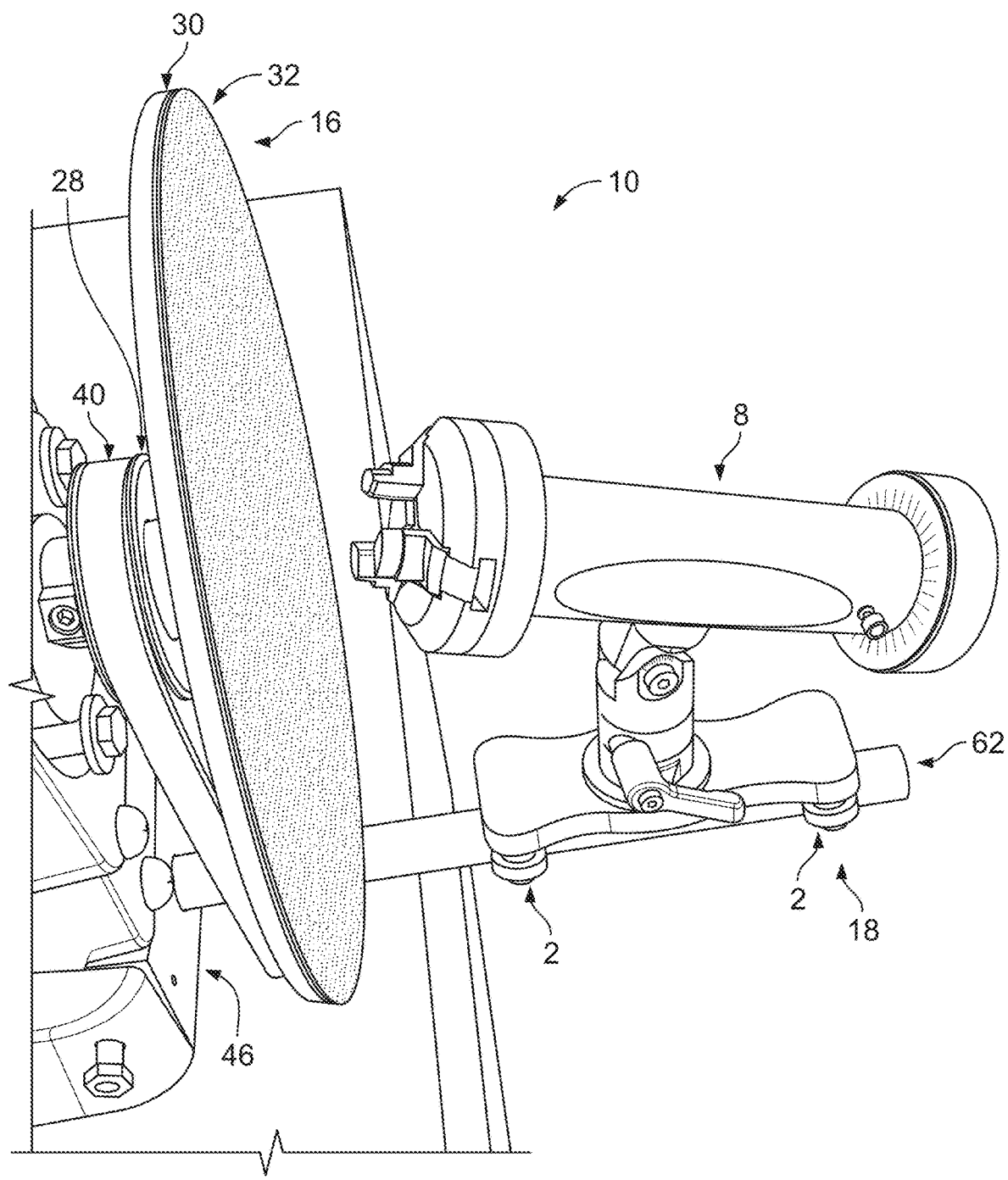
FIG. 13 is a perspective detail view of a portion of the watch resurfacing device of FIG. 1, showing the second rotary disc resurfacing system and the second adjustment guide system holding the chuck without the watch component.
Figure 14:
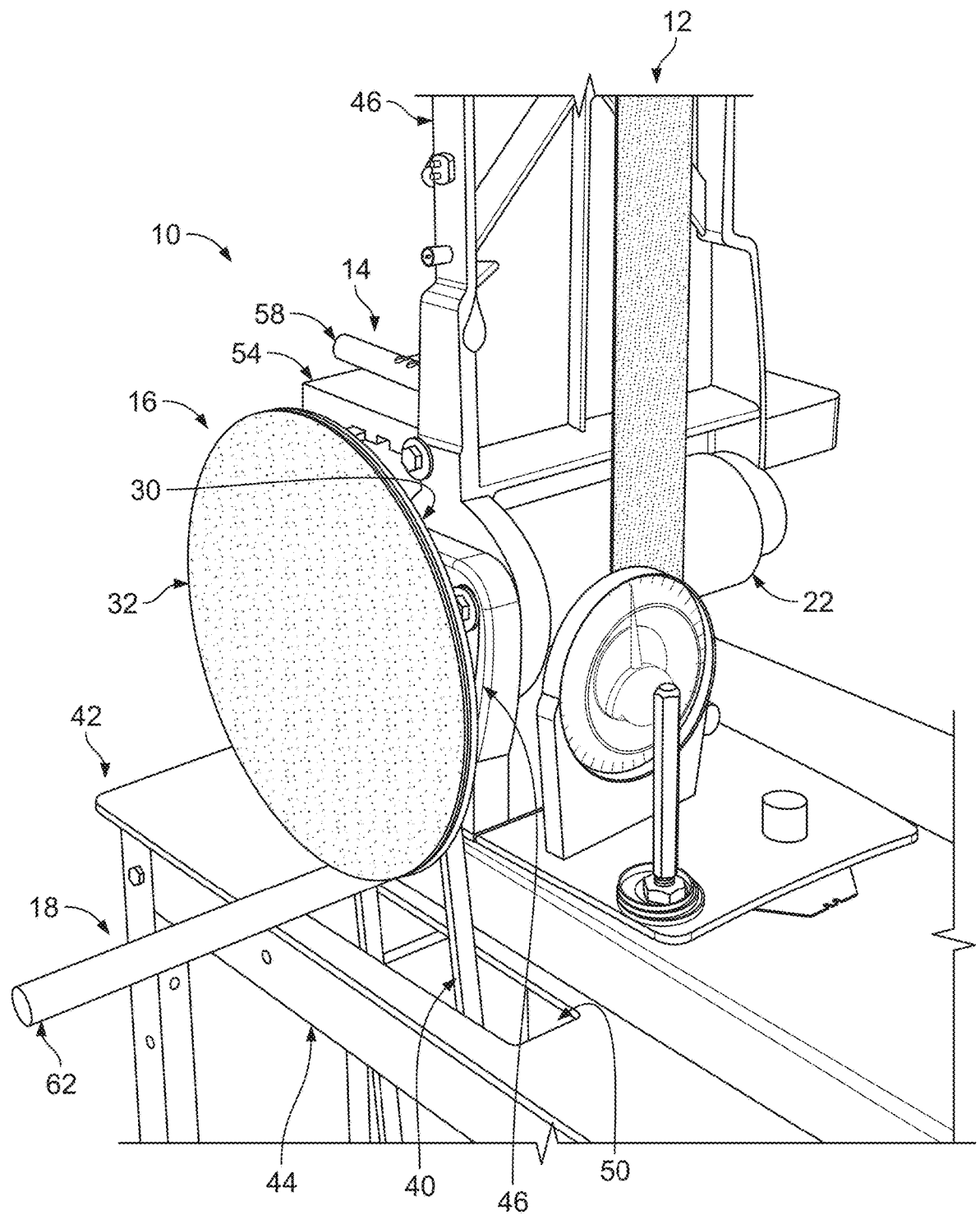
FIG. 14 is another perspective view of the second rotary disc resurfacing system and the second adjustment guide system of FIG. 13, shown without the chuck.
Figure 15:
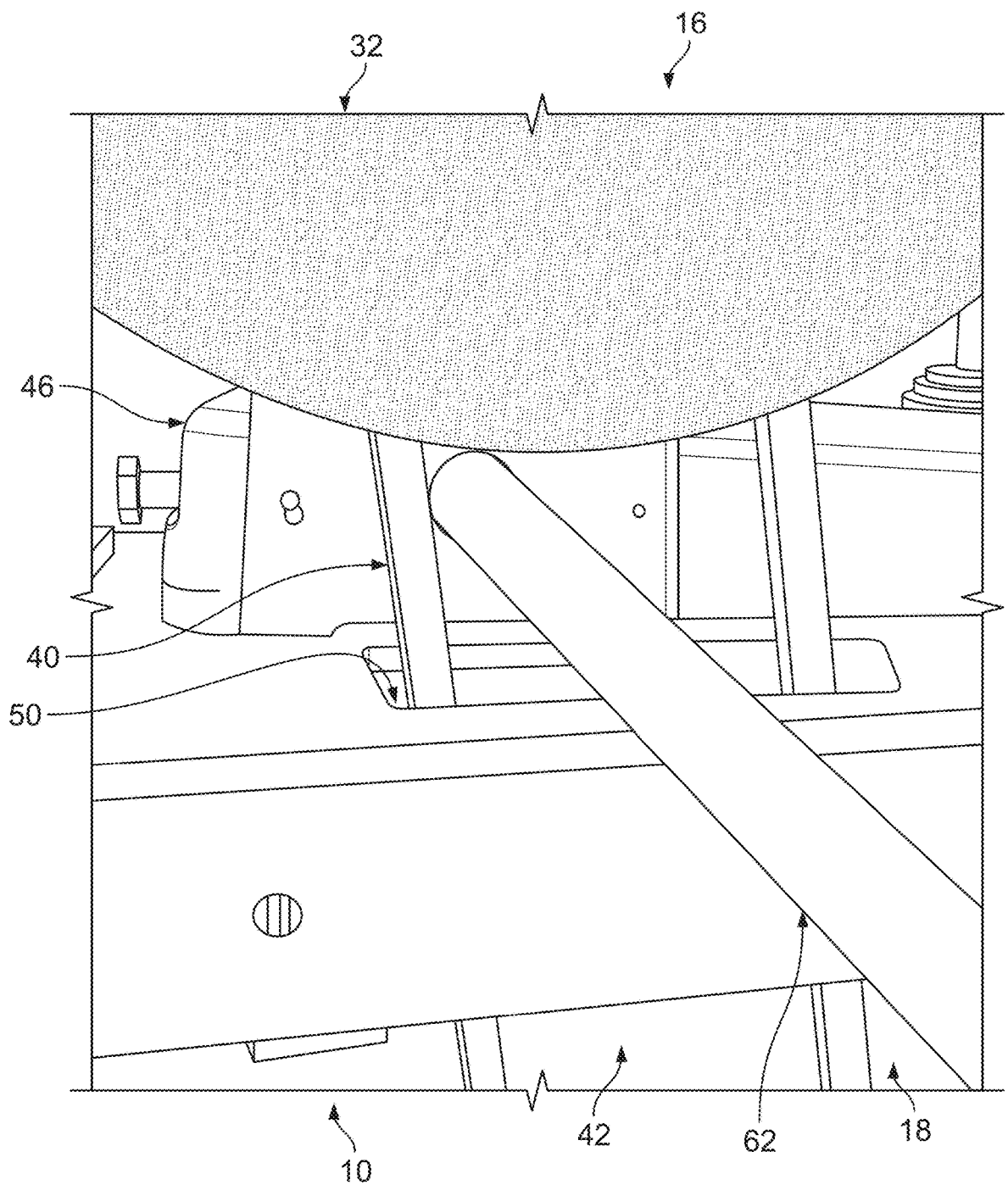
FIG. 15 is a perspective detail view of a portion of the second rotary disc resurfacing system and the second adjustment guide system of FIG. 14, showing a guide rail of the second adjustment guide system mounted in place for use.
Figure 16:
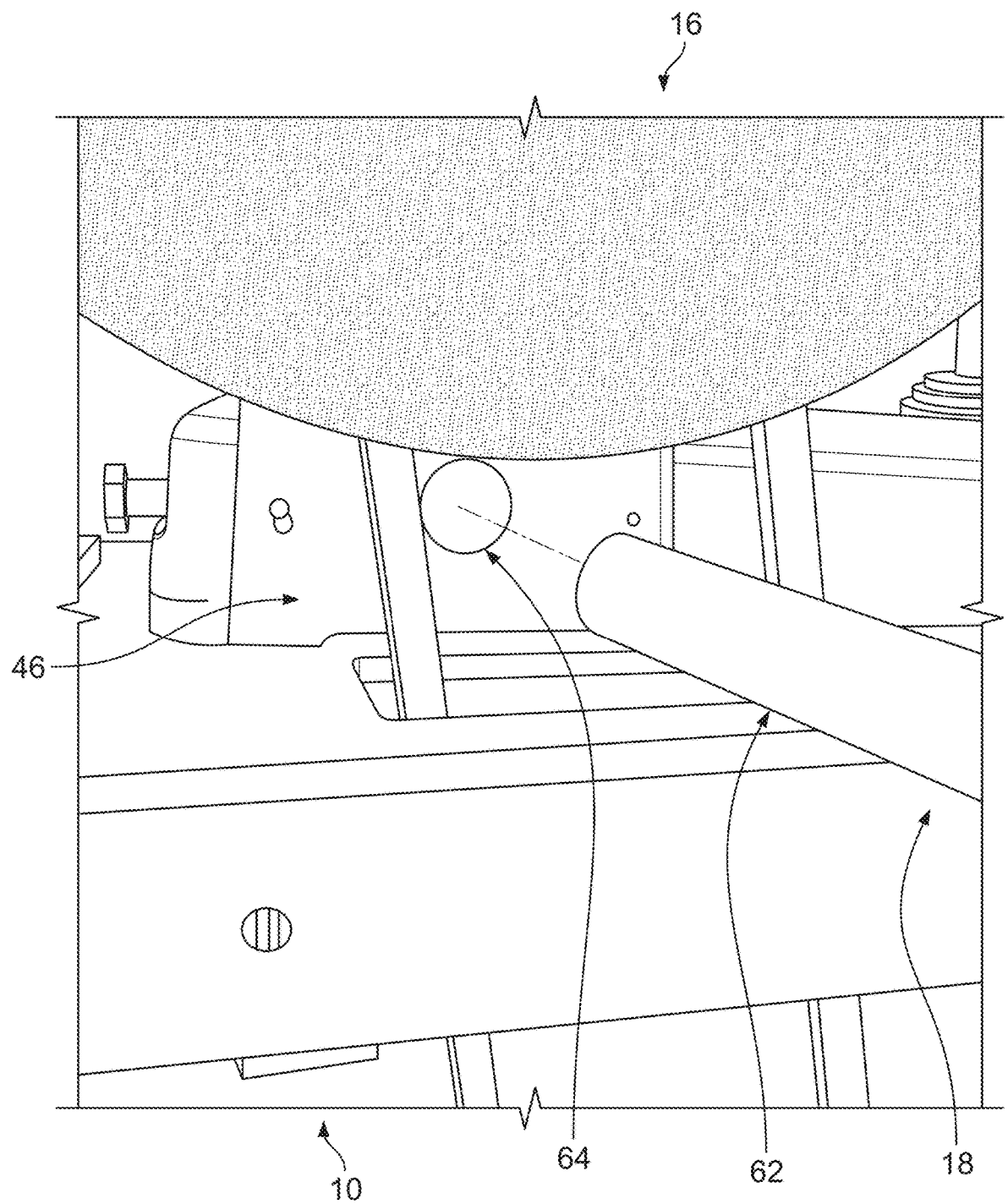
FIG. 16 shows the second rotary disc resurfacing system and the second adjustment guide system of FIG. 15, with the guide rail being removed for storage and clearance purposes.
Figure 17:
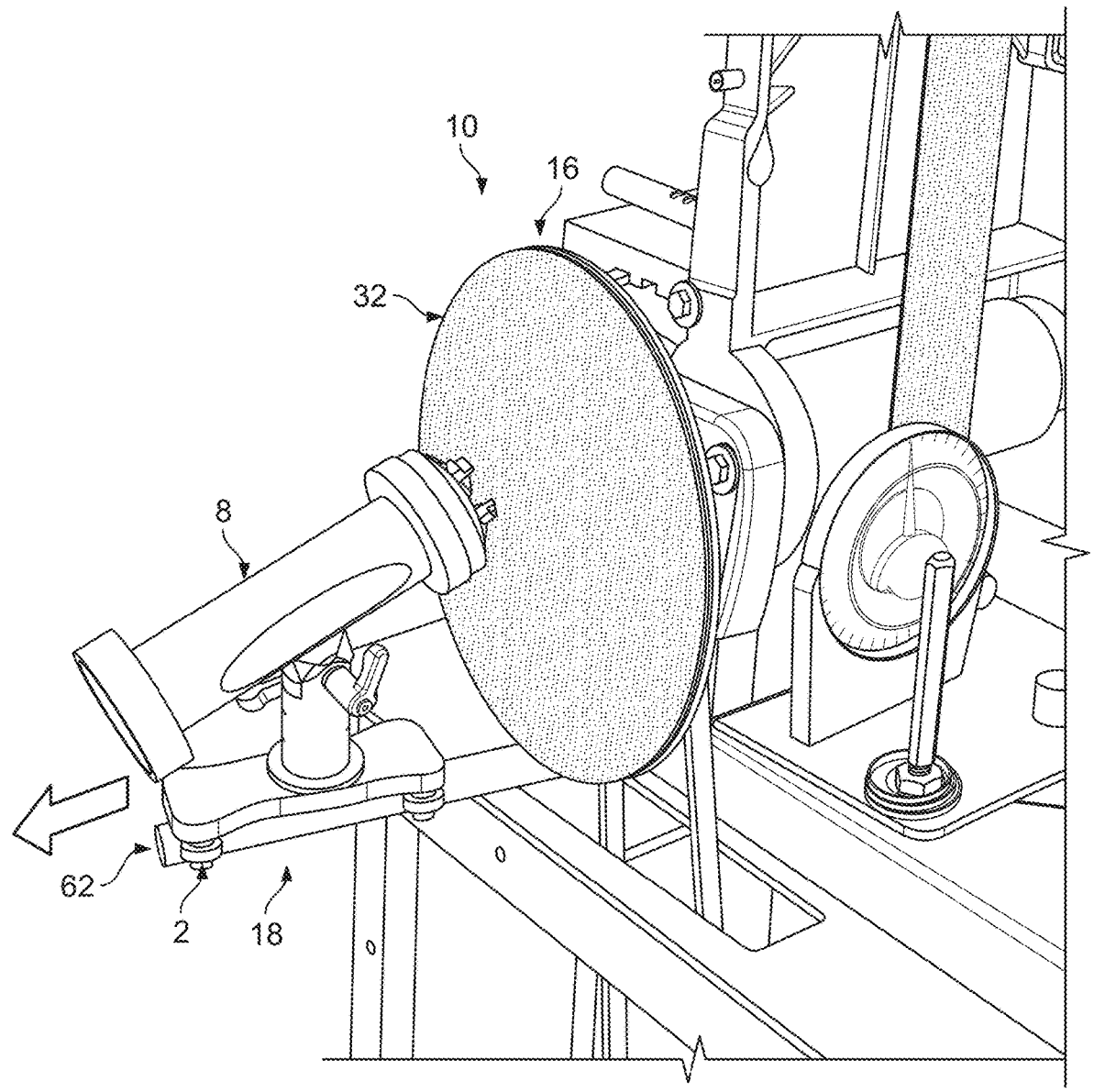
FIG. 17 is another perspective view of the second rotary disc resurfacing system and the second adjustment guide system of FIG. 13, with the second adjustment guide system in use offset/separation repositioning the chuck, as indicated by the linear directional arrow.
Figure 18:
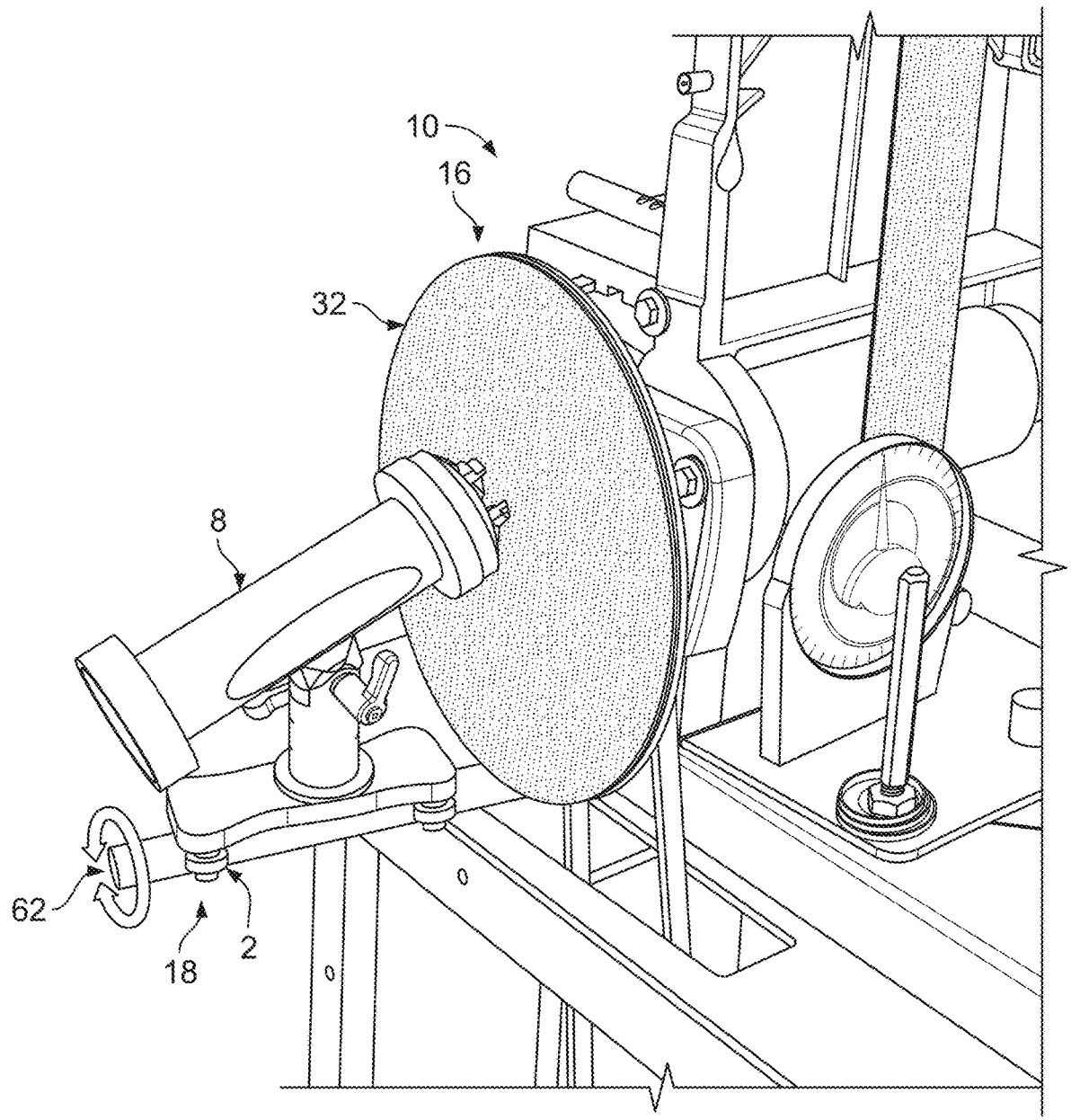
FIG. 18 shows the second rotary disc resurfacing system and the second adjustment guide system of FIG. 17, with the second adjustment guide system in use angularly repositioning the chuck, as indicated by the angular directional arrow.
Figure 19:
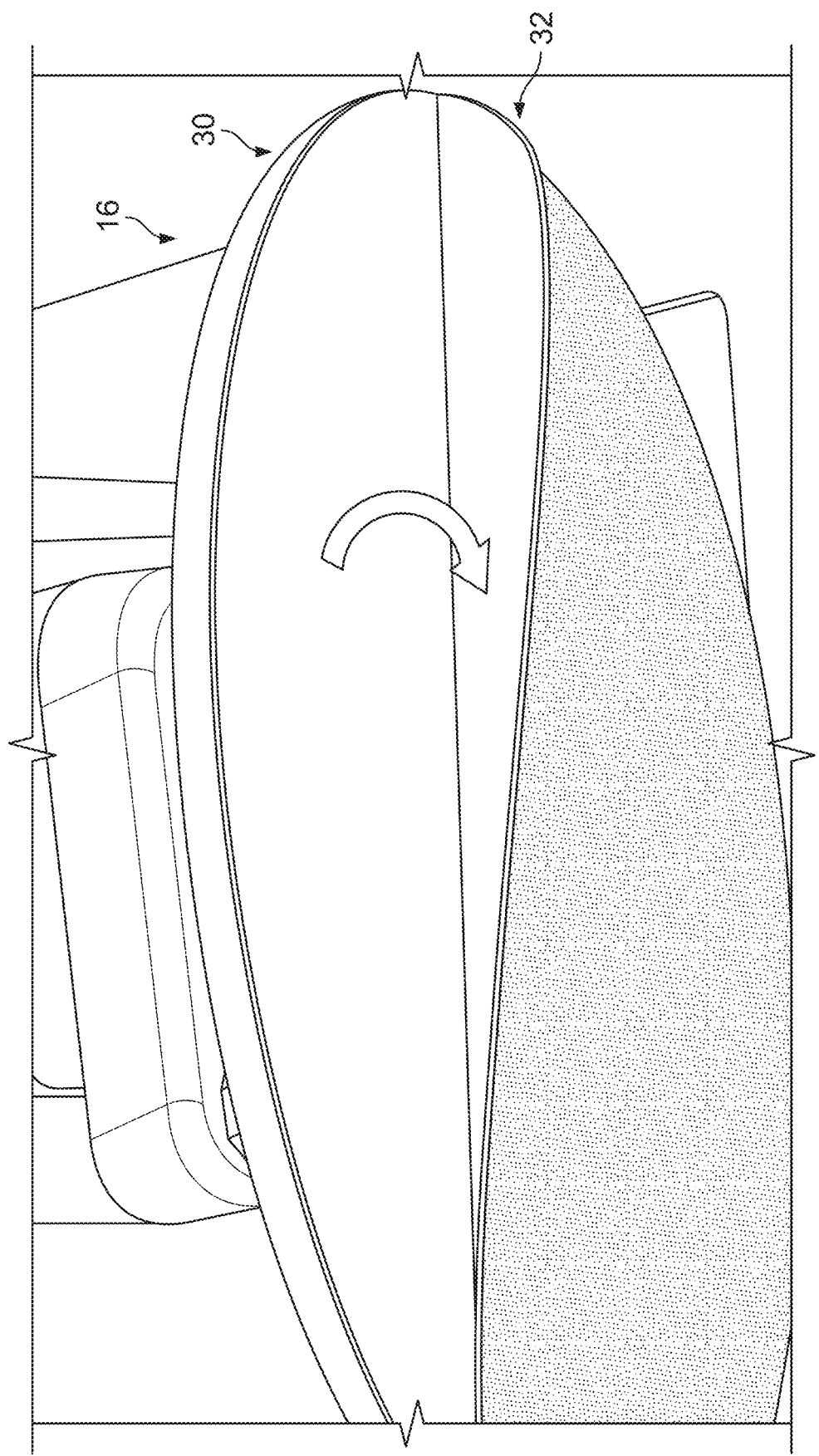
FIG. 19 is a perspective detail view of a portion of the second rotary disc resurfacing system of FIG. 13, showing a metal rotary mounting disc and a replaceable resurfacing disc with a magnetic backing that magnetically adheres to the rotary mounting disc, with the replaceable resurfacing disc being peeled away from the metal mounting disc as indicated by the angular directional arrow.
Figure 20:
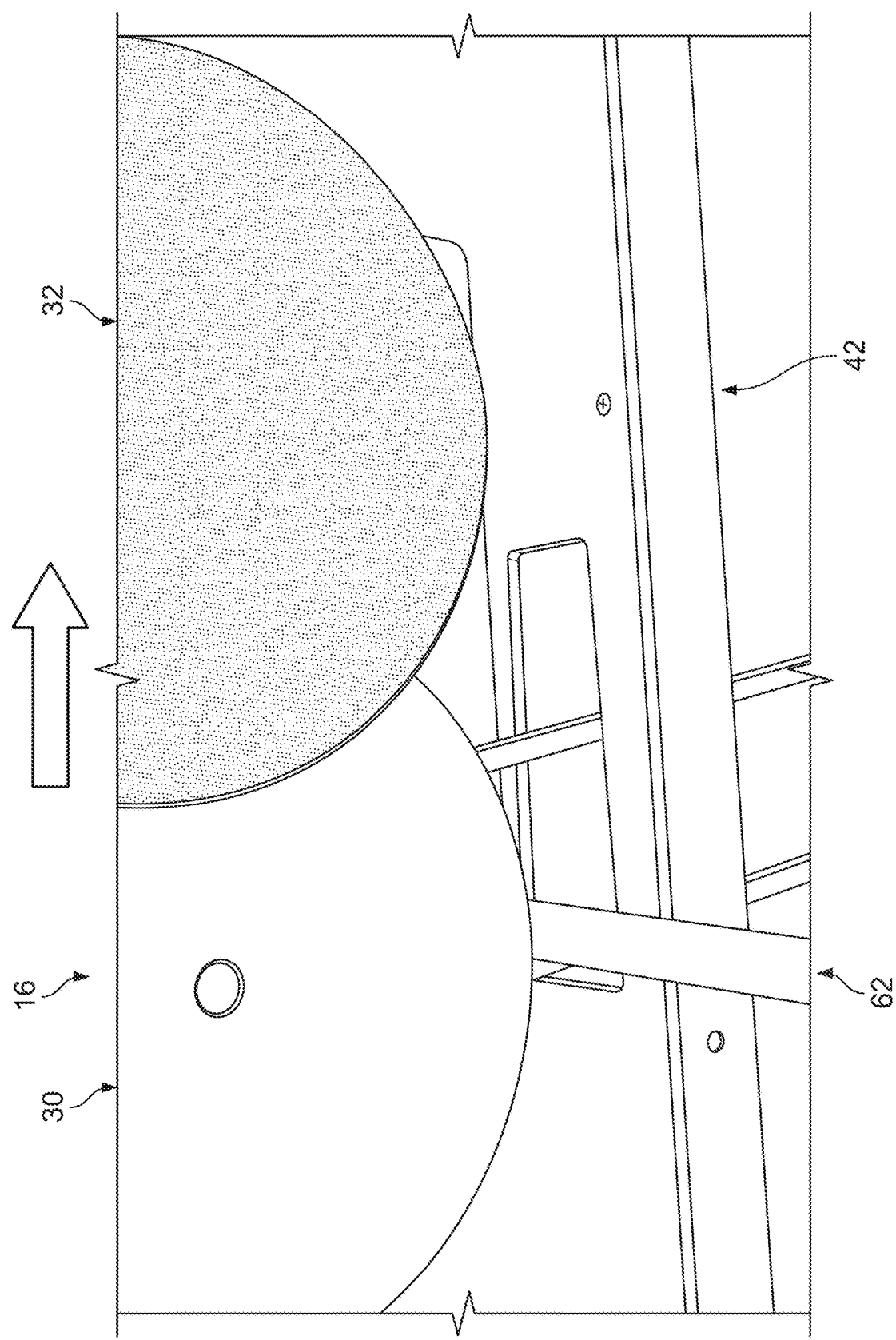
FIG. 20 is another perspective detail view of a portion of the second rotary disc resurfacing system of FIG. 19, showing the replaceable magnetic resurfacing disc being removed from the metal mounting disc, as indicated by the angular directional arrow, so that a fresh resurfacing disc can be installed in its place for use.
Figure 21:
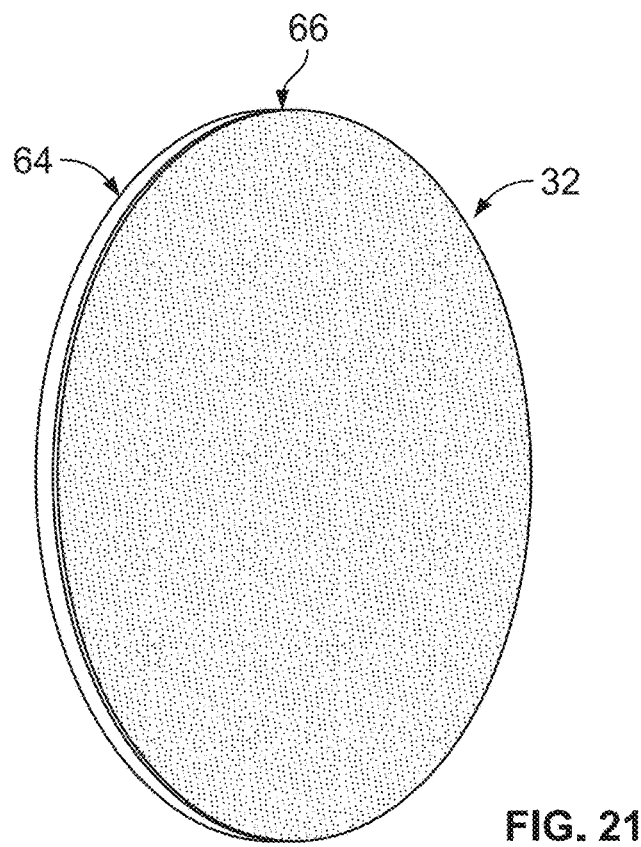
FIG. 21 is a perspective view of the replaceable magnetic resurfacing disc of FIG. 19, showing a circular resurfacing front layer and a circular magnetic back layer.
Figure 22:
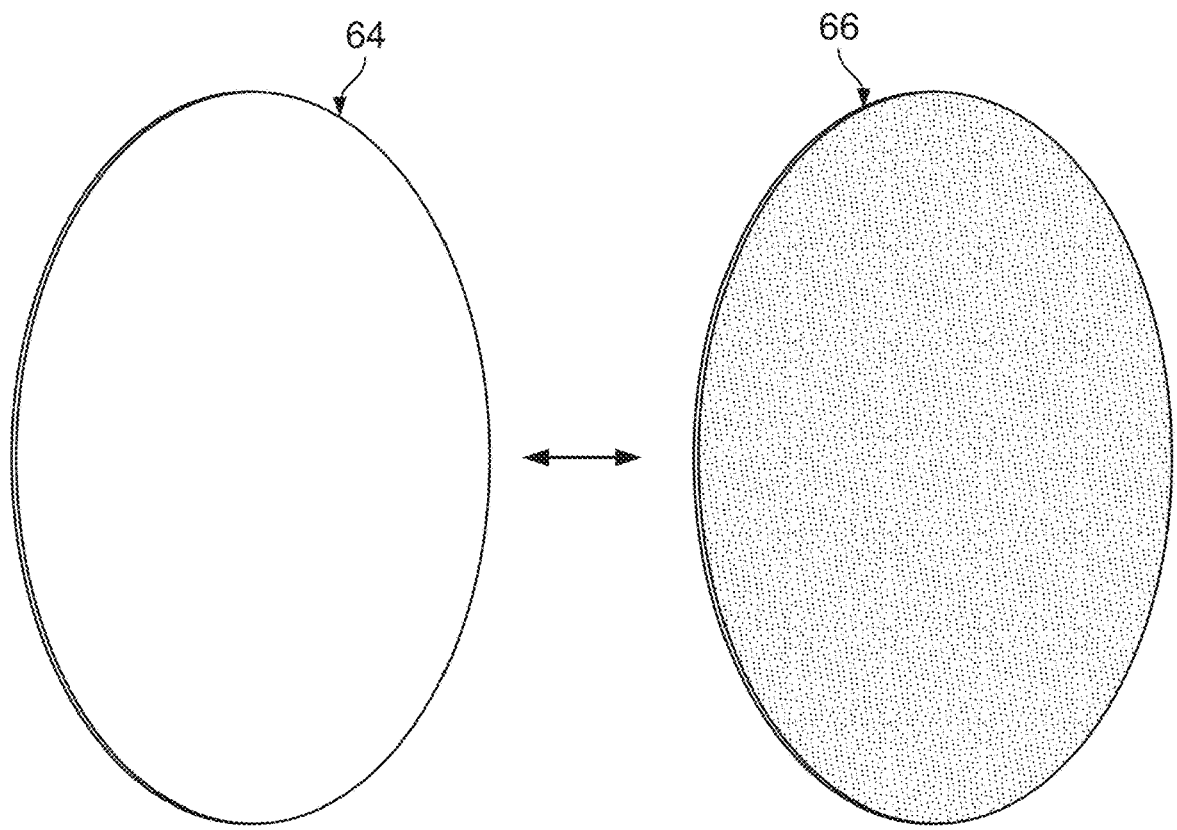
FIG. 22 is an exploded view of the replaceable magnetic resurfacing disc of FIG. 21.
Figure 24:
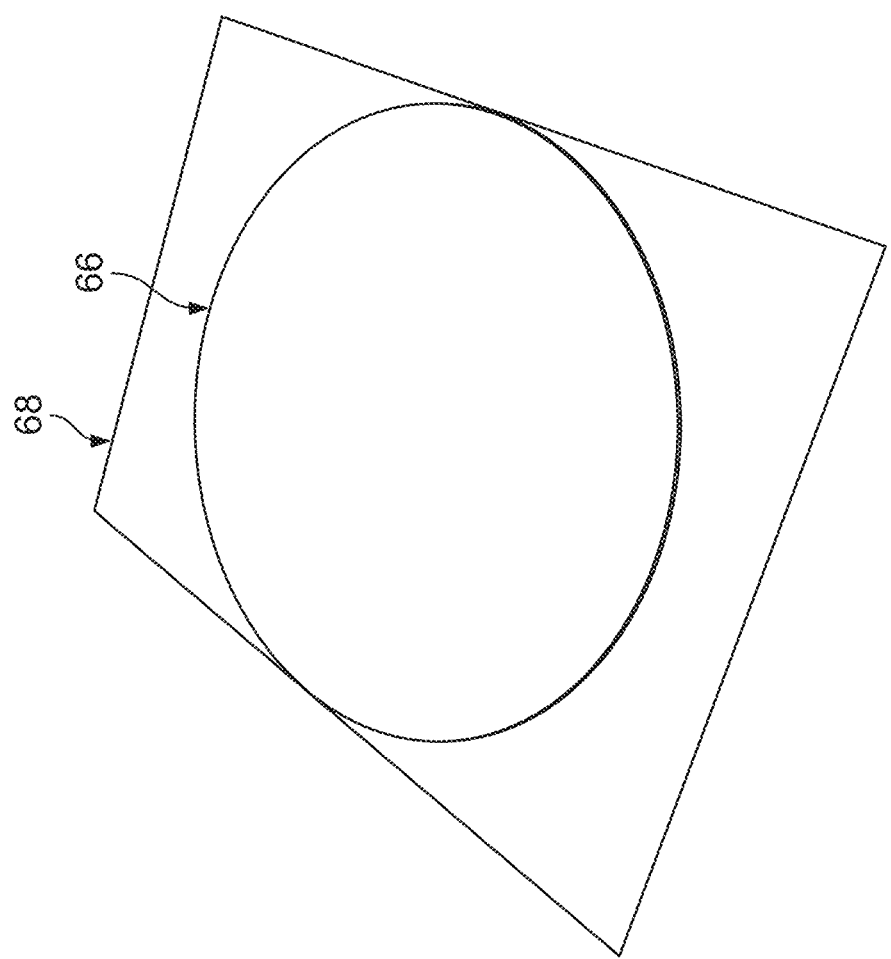
FIG. 24 shows the magnetic sheet of FIG. 21 with the circular magnetic back layer being formed from it.
Figure 23:
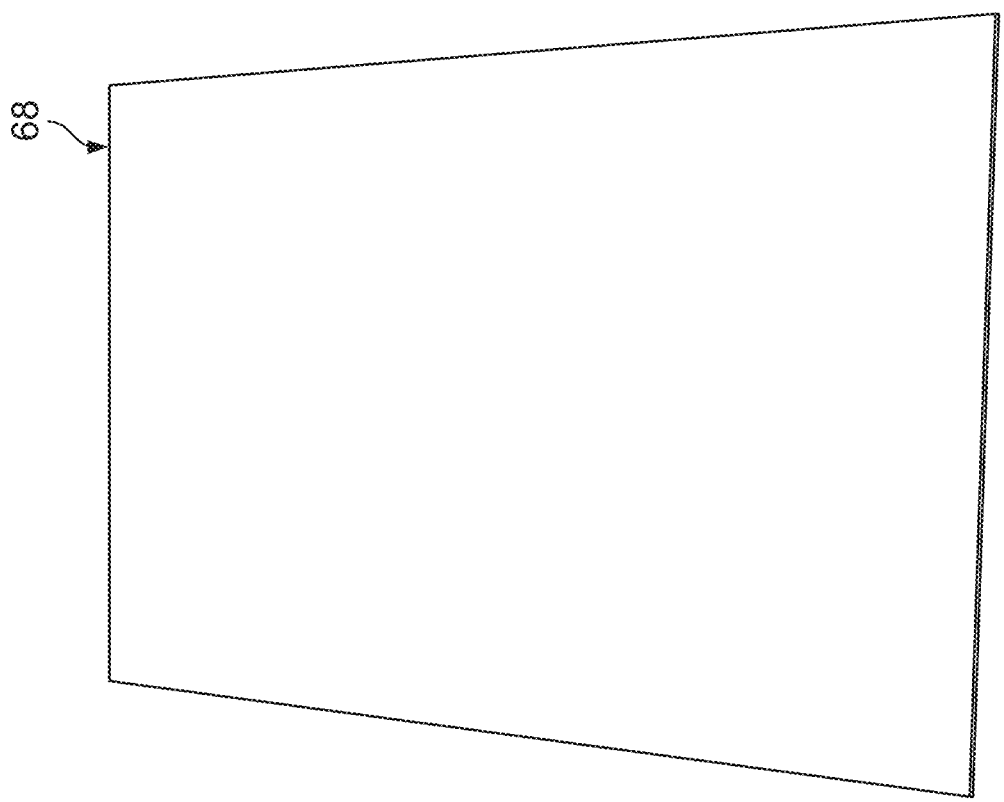
FIG. 23 is a perspective detail view of a magnetic sheet use to form the replaceable magnetic resurfacing disc of FIG. 21.

Referring particularly to FIGS. 4-6, the first linear belt resurfacing system 12 is rotationally driven and includes a drive roller 22 (a rotary drive member), a free roller 24 spaced apart from the drive roller, and a resurfacing belt 26 that is routed around the two rollers and driven by the drive roller. Rotation of the drive roller 22 drives the resurfacing belt 26 to move in a loop about the two rollers 22 and 24. The resurfacing belt 26 is typically flat, replaceable, and has a linear operating motion in that it moves linearly between the rollers 22 and 24 (where it is used for resurfacing), though of course it also turns around the rollers in a loop, and though in other embodiments it can move in a generally circular or elliptical motion.

In addition, the second rotary disc resurfacing system 16 is rotationally driven and includes a drive flange 28 (a rotary drive member) extending from a mounting disc 30 to which replaceable rotary resurfacing discs 32 removably mount. Rotation of the drive flange 28 drives the mounting disc 30 and attached resurfacing disc 32 through a rotary operating motion for resurfacing. Thus, each of the two resurfacing systems 12 and 16 is rotationally driven, includes a replaceable abrasive resurfacing element (i.e., a belt 26 or disc 32), and includes a rotary drive interface element (i.e., a drive roller 22 or drive flange 28).

In the depicted embodiment, the common rotary drive system 20 drives both the first and second resurfacing systems 12 and 16. In particular, the drive system 20 includes a rotary connecting member 34 that extends between and operably interconnects the drive roller 22 of the first linear belt resurfacing system 12 and the drive flange 28 of the second rotary disc resurfacing system 16. The rotary connecting member 34 can be a rod (as depicted) or another structural shaft element that transmits rotational forces between the connected components. Rotation of any one of the connecting member 34, the drive roller 22, and the drive flange 28 produces rotation of all three of these components, as they are rotationally coupled together for joint/common rotational movement.

The drive system 20 also includes a rotary drive actuator 36 that drives the connecting member 34, the drive roller 22, and the drive flange 28 through their joint/common rotational movement. The rotary drive actuator 36 can be of a conventional type, for example a commercially available electric motor that electrically connects to a standard electric power source. The rotary drive actuator 36 has a rotary output shaft 38 that can be indirectly connected to one of the connecting member 34, the drive roller 22, and the drive flange 28 by a drive linkage 40. So operation of the rotary drive actuator 36 causes both the resurfacing belt 26 (of the first linear belt resurfacing system 12) and the resurfacing disc 32 (of the second rotary disc resurfacing system 16) to operate at the same time.

Also, the drive system 20 includes a control system (not shown) for operating the rotary drive actuator 36 and thus the operably connected resurfacing systems 12 and 16. The control system can be of a conventional type, including controls for functions including on/off, rotational speed, etc.

In the depicted embodiment, the drive linkage is a drive belt 40 routed around the output shaft 38 and the drive flange 28, so that rotation of the output shaft 38 rotationally drives the drive flange 38, which in turn rotationally drives the connecting member 34 and the drive roller 22. In some embodiments, the drive linkage is of another conventional type, for example a gear-set, a chain, or another motion transferring element. In some embodiments, the drive linkage operably connects to and rotationally drives the connecting member or the drive roller (instead of the drive flange) to produce the same end result of joint/common driving and simultaneous operation of the first linear belt resurfacing system and the second rotary disc resurfacing system. In some embodiments, the rotary output shaft is directly connected to one of the connecting member, the drive roller, and the drive flange, without an interconnecting drive linkage.

And in some embodiments, the drive system includes a clutch and/or transmission system that is operable to enable each of the two resurfacing systems to be operated independently of each other, but still by the same common drive actuator. In some such embodiments, the rotary drive actuator is operably connected to the connecting member (e.g., to a pulley on the connecting member) and the drive roller and the drive flange are selectively and independently detachable from the connecting member by a clutch system, so that only one of the resurfacing systems 12 and 16 is operated at a time. And in some such embodiments, the drive roller and the drive flange are driven at different rotational speeds by a transmission system that interconnects one or both of them to the connecting member, so that the resurfacing systems 12 and 16 are operated at different speeds.

Furthermore, in some embodiments having other types and/or combinations of rotationally driven resurfacing systems (e.g., two linear belt resurfacing systems, two rotary disc resurfacing systems, or one of those and a third different type of rotationally driven resurfacing system), the connecting member 34 extends between and operably interconnects the respective rotary drive interface elements (e.g., drive rollers and/or drive flanges) to produce the same joint/common rotational movement of all three interconnected rotary components. In such embodiments, the drive linkage can be connected to any of these three rotary drive elements to produce the same end result of joint/common driving and simultaneous operation of the respective abrasive resurfacing elements (e.g., belts or discs) of the respective multiple resurfacing systems.

In typical embodiments such as that depicted, the watch resurfacing device 10 includes a support frame 42 to which these components are commonly mounted. For example, the frame 42 can be a metal framework with a base 44 (e.g., floor standing), an intermediate section 46 above that (e.g., at about table-top working level for standing (adult) technicians), and an upper section 48 above that. The rotary drive actuator 36 can be mounted to the frame base 44. The connecting member 34, the drive flange 28, and the drive roller 24 can be rotationally mounted to the frame intermediate section 46. And the free roller 24 can be rotationally mounted to the frame upper section 48. Also, the drive linkage 40 can extend through an opening 50 in the frame base 44 so that it interconnects the drive actuator 36 to the resurfacing systems 12 and 16 (see, e.g., FIGS. 4 and 14-18).

In other embodiments, the multiple resurfacing systems and the drive system are commonly mounted to another type and/or arrangement of support frame. In other embodiments, one or more of the multiple resurfacing systems and the drive system are separately mounted to separate support frames that are each fixed in place to enable the joint/common operation described herein.

In typical embodiments, the belt and disc resurfacing systems 12 and 16 are arranged with their drive roller and flange 22 and 28 aligned (or parallel) but with their respective resurfacing belt and disc elements 26 and 32 transverse (e.g., perpendicular) to each other, as shown in FIG. 4. In this way, two technicians can use the watch resurfacing device 10 at the same time, with one technician (at a first of the four sides of the device) using the belt resurfacing system 12, while the other technician (at a second adjacent side) uses the disc resurfacing system 16, without getting in each other's way. Some embodiments include another belt resurfacing system of the same type but oppositely (and offset) positioned (at a third side) with its drive roller connected to the connecting member and longitudinally offset from the first drive roller and/or another disc resurfacing system of the same type but oppositely positioned (at a fourth side) with its drive flange connected to the opposite end of the connecting member. Some embodiments include only rotary disc resurfacing systems, for example with a 90-degree motion converter between the connecting member and one of the drive flanges. Some embodiments include only linear belt disc resurfacing systems, for example with a 90-degree motion converter between the connecting member and one of the drive rollers. And for some embodiments, at the same time a technician is using the resurfacing belt, another technician can use the opposite side of the resurfacing belt at the opposite side of the device 10.

Referring particularly to FIGS. 1-5 and 7-12, the first adjustment guide system 14 is used to position the chuck 8 (and thus the watch component 6 held by it) relative to the resurfacing belt 26 of the first resurfacing system 12. The first adjustment guide system 14 includes two transverse (e.g., perpendicular) guide rails providing linear offset/ distance and linear lateral position adjustment and guidance of the chuck 8 (and thus the watch component 6) relative to the resurfacing belt 26. For example, the depicted first adjustment guide system 14 includes a base plate 52, a laterally sliding guide plate 54, a first laterally extending lateral guide rail 56, and a second distally extending offset guide rail 58 that is perpendicular to the first laterally extending guide rail. The base plate 52 is fixedly mounted in place, typically to the support frame 42 (e.g., to its upper section 48). The guide rail 56 extends vertically between the base plate 52 and the guide plate 54 to permit the guide plate 54 to slide laterally on the fixed base plate 52. For example, the guide rail 56 can extend from one of the base or guide plate 52 or 54 and be received in a guide channel 60 of the other of the base or guide plate 52 and 54, with the guide rail 56 and the guide channel 60 laterally extending and having mating configurations (e.g., shapes and sizes providing operable engagement/retention with free sliding movement) to cooperatively enable the sliding motion. That is, the guide plate 54 slides laterally, guided by the laterally extending guide rail and channel 56 and 60, to laterally reposition the chuck 8, for example between the position of FIG. 7 and the position of FIG. 11 (as indicated by the lateral linear directional arrows). This provides the linear lateral position adjustment and guidance of the chuck 8 (and thus the watch component 6) relative to the resurfacing belt 26, that is, adjustable movement in a plane parallel to the resurfacing belt 26, enabling guided access to and use of the full width of the resurfacing belt 26.

The guide rail 56 can be a bar (as depicted), rod, rib, or other elongated protruding rail element providing linear guidance as described herein. The guide channel 60 can be a groove, slot, or another elongated recessed channel element providing linear guidance as described herein. The guide rail 56 can extend upward from the base plate 52 and be received in the channel 60 in a lower surface of the guide plate 54 (as depicted), or these can be in a vice versa arrangement with the first guide rail extending downward from the guide plate and received in a channel of the upper surface of the base plate. The guide rail and channel 56 and 60 can include interlocking slide-permitting features (e.g., an enlarged head on the rail and an enlarged well in the channel) so that the guide plate 54 cannot be removed and separated from the base plate 52.

Multiple parallel guide channels 60 can be included (e.g., two are depicted) to enable the guide plate 54 to be positioned (closer to or farther from the resurfacing belt 26) for engaging use with either one of them as may be desired for the particular task at hand. This enables the guide plate 54 to be separated from the base plate 52, repositioned closer to or farther from the resurfacing belt 26, and reinstalled into place for use.

In addition, the second distally extending guide rail 58 extends upwardly from the guide plate 54, is perpendicular to the resurfacing belt 26, and is perpendicular to the first guide rail 56. The second guide rail 58 is configured (e.g., shaped and sized) to be received between at least one pair of the opposing feet 2 of the chuck 8 (i.e., within a gap between the feet), so that the chuck feet contact and are guided linearly along the second guide rail 58. In this way, the chuck 8 (and thus the watch component 6) is adjustably repositionable by sliding it distally (linearly closer to and farther from) the resurfacing belt 26, guided by the distally extending guide rail 58 and chuck feet 2, to distally reposition the chuck 8, for example between the position of FIG. 7 and the position of FIG. 12 (as indicated by the linear distal/offset directional arrows). This provides the linear distal/offset position adjustment and guidance of the chuck 8 (and thus the watch component 6) relative to the resurfacing belt 26, that is, adjustable movement in a plane perpendicular to the resurfacing belt 26 and perpendicular to the longitudinal orientation of the resurfacing belt.

In the depicted embodiment, the chuck 8 has roller feet 2 that contact and roll (in a guided manner) linearly along the second guide rail 58. Also, the depicted second guide rail 56 is a longitudinal portion/section of a cylindrical rod (e.g., more than a semi-cylindrical portion) for good engagement with the chuck roller feet 2, and it is fixedly mounted in position to the guide plate 54. In other embodiments, the chuck feet do not roll and the chuck is lifted slightly off the second guide rail to distally linearly reposition it. In other embodiments, the second guide rail 56 is a bar or other guide rail element providing linear guidance as described herein.

This positioning adjustment of the chuck 8 enabled by the first adjustment guidance system 14 enables precise positioning and orienting of the watch component 6 at different locations of the replaceable abrasive resurfacing element 26. Also, this linear offset/distance and linear lateral position adjustment and guidance of the chuck 8 (and thus the watch component 6) provided by the first adjustment guide system 14 is in addition to the adjustment provided by the chuck 8 itself, which can be of an articulating type providing multiple adjustments, as noted above. In some embodiments, the watch refurbishing device 10 is used with other chucks 8 providing more or fewer adjustment options, regardless the device 10 provides the same linear offset/distance and linear lateral position adjustment options.

Furthermore, in the depicted embodiment, the height of the second guide rail 58 is selected, relative to the depth of the gap between the chuck feet 2, so that the chuck feet also contact the guide plate 54 (in addition to contacting the second guide rail). For example, the height of the second guide rail 58 and the depth of the gap between the chuck feet 2 can be the same, or the height of the second guide rail 58 can be less than the depth of the gap between the chuck feet 2, so the chuck feet are not elevated above the guide plate 54. In this way, the chuck 8 cannot angularly move (pivot laterally) about the second guide rail 58 and is thus maintained in a level position on the guide plate 54. In other embodiments, the height of the second guide rail 58 is selected, relative to the depth of the gap between the chuck feet 2, so that the chuck feet are elevated above (and do not contact) the guide plate 24 (e.g., the height of the second guide rail 58 can be greater than the depth of the gap between the chuck feet 2), so that the chuck 8 (and the watch component 6 it holds) can be manually angled (rotated) about the axis of the second guide rail 58 (in a plane parallel to the resurfacing belt 26) to provide angular adjustment and guidance in addition to the other adjustment options described herein.

Referring particularly to FIGS. 1-4, 6, and 13-18, the second adjustment guide system 18 is used to position the chuck 8 (and thus the watch component 6 held by it) relative to the resurfacing disc 32 of the second resurfacing system 16. The second adjustment guide system 18 includes a distally extending offset guide rail 62 providing linear offset/distance and angular adjustment and guidance of the chuck 8 (and thus the watch component 6) relative to the resurfacing disc 32. The guide rail 62 extends distally and perpendicularly to the resurfacing disc 32, from behind the disc 32 (where it mounts in place) to in front of it (where the chuck 8 can be positioned and guided).

In the depicted embodiment, the guide rail 62 is configured (e.g., shaped and sized) to be received between the pair/s of the opposing feet 2 of the chuck 8 (i.e., within the gap/s between the feet), so that the chuck feet contact and are guided linearly/distally along the guide rail 62. In this way, the chuck 8 (and thus the watch component 6) is adjustably repositionable by sliding it distally (linearly closer to and farther from) the resurfacing disc 32, guided by the distally extending guide rail 62 and chuck feet 2, to distally reposition the chuck 8, for example between the position of FIG. 13 and the position of FIG. 17 (as indicated by the linear distal/offset directional arrows). This provides the linear distal/offset position adjustment and guidance of the chuck 8 (and thus the watch component 6) relative to the resurfacing disc 32, that is, adjustable movement along an axis (and plane) perpendicular to the resurfacing disc 32.

In the depicted embodiment, the chuck 8 has roller feet 2 that contact and roll (in a guided manner) linearly along the guide rail 62. For example, the guide rail 62 can be configured to work with the same chuck 8 (and feet 2) as the second guide rail 58 described above. In this way, the same chuck 8 can be used sequentially on both the first belt and second disc resurfacing systems 12 and 16. As such, the guide rail 62 can be a cylindrical rod, as depicted. In other embodiments, the chuck feet do not roll and the chuck is lifted slightly off the guide rail 62 to distally reposition it. And in other embodiments, the guide rail 62 is a bar or other guide rail element providing linear guidance as described herein.

In addition, the guide rail 62 is typically mounted to the support frame 42, for example its intermediate section 44. Typically, the guide rail 62 is removably mounted in place, for example by being received (e.g., with a friction fit, by screw threads, etc.) within an opening 64 in the frame 42. In this way, the guide rail 62 can be mounted in place for use when needed and removed when not needed (e.g., when the disc resurfacing system 16 is not in use, or when it is but chuck positioning guidance is not needed), to provide clearance and avoid being an obstruction. Also, the guide rail 62 typically extends within the (elongated) loop formed by the drive belt 40 (between the two oppositely moving segments of the drive belt, see, e.g., FIGS. 14-15).

Furthermore, in the depicted embodiment, the configuration (e.g., size and cylindrical shape) of the guide rail 62, and the configuration (e.g., spacing or gap size) of the chuck feet 2, enable the chuck 8 to angularly move (pivot laterally) about the guide rail 62. In this way, the chuck 8 (and thus the watch component 6) is adjustably repositionable by rotating it (about the axis of the guide rail 62), for example between the position of FIG. 13 and the position of FIG. 18 (as indicated by the angular directional arrows). This provides the angular position adjustment and guidance of the chuck 8 (and thus the watch component 6) relative to the resurfacing disc 32, that is, angularly adjustable movement in a plane parallel to the resurfacing disc 32.

This positioning adjustment of the chuck 8 enabled by the second adjustment guidance system 18 enables precise positioning and orienting of the watch component 6 at different locations of the replaceable abrasive resurfacing element 32. Also, this positioning adjustment is in addition to the adjustment provided by the chuck 8 itself, which can be of an articulating type providing multiple adjustments, as noted above. In some embodiments, the watch refurbishing device 10 is used with other chucks 8 providing more or fewer adjustment options, regardless the device 10 provides the same linear offset/distance and linear lateral position adjustment options.

Referring additionally to FIGS. 19-24, the second rotary disc resurfacing system 16 includes replaceable abrasive resurfacing discs 32, as previously noted. In the depicted embodiment, the mounting disc 30 of the disc resurfacing system 16 is metal and the replaceable resurfacing discs 32 are removably magnetically mounted to the mounting disc. This provides for quick and easy replacement of the resurfacing discs 32 as they wear to and need to be changed out. Also the resurfacing discs 32 are provided with varying abrasiveness (e.g., grits) and materials (e.g., paper or cloth), and this also enables the technician to select an appropriate resurfacing disc for a particular application and quickly and easily affix it to the mounting disc 30.

For example, the replaceable resurfacing discs 32 can include a circular magnetic back layer 66 and a circular resurfacing front layer 66. The magnetic back layer 66 removably mounts by magnetic forces to the metal mounting disc 30 of the disc resurfacing system 16, so that the replaceable resurfacing discs 32 can be quickly and easily changed out. In some embodiments, the replaceable resurfacing discs 32 (or at least one of the magnetic back layer 66 and the resurfacing front layer 66) includes a tab or other protruding portion that extends radially outward beyond the mounting disc to provide a location for manually grasping and removing the replaceable resurfacing discs 32. In order for the replaceable resurfacing discs 32 to be held in place during use, without slipping, the magnetic layer sheet is selected with a relatively low weight, thin dimension, and/or high magnetic property, and the force needed to be applied to the watch component for resurfacing is relatively low.

The magnetic back layer 66 can be formed (e.g., cut out) from a sheet of magnetic material 68. Also, the magnetic back layer 66 and the resurfacing front layer 66 can be secured together by an adhesive or other conventional attachment or binder. In other embodiments, the replaceable resurfacing discs 32 can be configured and made in other ways known to those skilled in the art.

In use, the magnetically adhered resurfacing disc can be quickly and easily replaced when the useful life of the existing one is over or if a different resurfacing property is desired (e.g., the grit or abrasiveness). The magnetically adhered resurfacing disc is removed from the rotary disc resurfacing system by applying a separation force sufficient to overcome the magnetic attraction forces of the magnetic back layer to the metal mounting disc. Then another magnetically adhered resurfacing disc is installed onto the metal mounting disc.

It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been shown and described in example forms, it will be apparent to those skilled in the art that many modifications, additions, and deletions can be made therein without departing from the spirit and scope of the invention as defined by the following claims.

What is claimed is:

1. A device for resurfacing a watch component on a chuck, the device comprising:
   a first resurfacing system comprising a first rotary drive member and a first resurfacing element that is driven through a first operating motion by the first rotary drive member and against which the watch component can be contacted for resurfacing;
   a second resurfacing system comprising a second rotary drive member and a second resurfacing element that is driven through a second operating motion by the first rotary drive member and against which the watch component can be contacted for resurfacing;
   a common drive system comprising a connecting member and an actuator operably connected to the connecting member, wherein the connecting member extends between and operably connects the first and second rotary drive members so that operation of the actuator rotationally drives both the first and second rotary drive members to drive both the first and second resurfacing elements through their respective operating motions;
   a first adjustment guide system comprising a first offset guide rail that is positioned offset relative to the first resurfacing element and that supports and guides the chuck to enable the watch component on the chuck to be positioned offset relative to the first resurfacing element during use; and
   a second adjustment guide system comprising a second offset guide rail that supports and guides the chuck to enable the watch component on the chuck to be positioned offset relative to the second resurfacing element during use,
wherein the first adjustment guide system includes a lateral guide rail that is transverse to the first offset guide rail to enable the watch component held by the chuck to be positioned laterally relative to the first resurfacing element during use, and
wherein the second resurfacing system is a rotary disc resurfacing system further comprising a metal rotary mounting disc driven by the second rotary drive member, wherein the second resurfacing element is a replaceable resurfacing disc comprising a magnetic back layer and a resurfacing front layer, wherein the replaceable resurfacing disc is magnetically adhered in place during use and is manually removable for replacement after use.

2. The watch resurfacing device of claim 1, wherein the first resurfacing system is a linear belt resurfacing system further comprises a free roller, wherein the first rotary drive member is a drive roller and the first resurfacing element is a linear resurfacing belt looped around the drive and free rollers.

3. The watch resurfacing device of claim 2, wherein the resurfacing belt of the first resurfacing system and the resurfacing disc of the second resurfacing system are perpendicular to each other.

4. The watch resurfacing device of claim 1, wherein the first rotary drive member, the second rotary drive member, and the connecting member are in alignment and rotationally driven together.

5. The watch resurfacing device of claim 1, wherein the first offset guide rail extends perpendicularly to the first resurfacing element, wherein the chuck slides along the first offset guide rail to offset reposition the watch component linearly closer to or farther from the first resurfacing element.

6. The watch resurfacing device of claim 5, wherein the first adjustment guide system further comprises a laterally sliding guide plate, wherein the first offset guide rail extends upwardly from the laterally sliding guide plate.

7. The watch resurfacing device of claim 6, wherein the first offset guide rail is fixedly mounted to the laterally sliding guide plate and has the shape of a partial cylinder.

8. The watch resurfacing device of claim 6, wherein the chuck has feet, wherein the first offset guide rail is configured to be received between the chuck feet, wherein the chuck feet contact the laterally sliding guide plate to prevent the chuck from being angularly repositioned about the first offset guide rail.

9. The watch resurfacing device of claim 6, wherein the first adjustment guide system further comprises a base plate, wherein the laterally sliding guide plate is positioned on and laterally slides on the base plate, and wherein the lateral guide rail slidingly engages between the base plate and the guide plate to guide the lateral sliding of the guide plate on the base plate.

10. The watch resurfacing device of claim 6, wherein the first adjustment guide system further comprise multiple channels into which the lateral guide rail can be received, wherein the laterally sliding guide plate can be repositioned on the base plate closer to or farther from the resurfacing element.

11. The watch resurfacing device of claim 1, wherein the second offset guide rail extends perpendicularly to the second resurfacing element, wherein the chuck slides along the second offset guide rail to reposition the watch component, closer to or farther from, the second resurfacing element.

12. The watch resurfacing device of claim 11, wherein the second offset guide rail is configured to be received between feet of the chuck permitting the chuck to be angularly repositioned about the second offset guide rail.

13. The watch resurfacing device of claim 1, further comprising a frame to which the second resurfacing system and the second adjustment guide system are mounted, wherein the frame includes a guide opening that removably receives the second offset guide rail during use, wherein the second offset guide rail is removably mounted to the frame so that it can be installed into the guide opening during use and removed from the guide opening when not in use to provide clearance and avoid being an obstruction.

14. The watch resurfacing device of claim 13, wherein the actuator is mounted to the frame and includes a rotary output shaft, wherein the common drive system further includes a linkage operably connecting the actuator output shaft and the drive flange, and wherein the frame includes a linkage opening through which the linkage extends.

15. The watch resurfacing device of claim 14, wherein the linkage is looped around the actuator output shaft and the drive flange, and wherein the second offset guide rail extends through the looped linkage and into the guide opening during use.

16. A device for resurfacing a metallic component of a watch held by a chuck having support feet, the device comprising:
- a first linear belt resurfacing system comprising a drive roller, a free roller, and a resurfacing belt looped around the drive and free rollers, driven through a linear operating motion by the drive roller, and against which the metallic watch component can be contacted for resurfacing;
- a second rotary disc resurfacing system comprising a drive flange, a mounting disc driven by the drive flange, and a replaceable resurfacing disc removably mounted to the mounting disc, driven through a rotary operating motion by the drive flange, and against which the metallic watch component can be contacted for resurfacing, wherein the resurfacing disc is perpendicular to the resurfacing belt, wherein the mounting disc is metal, the resurfacing disc includes a magnetic back layer and a resurfacing front layer, wherein the magnetic back layer removably adheres the resurfacing disc to the metal mounting disc during use and permits manually removal and replacement of the resurfacing disc after use,
- a common drive system comprising a connecting member and a rotary motor operably connected to the connecting member, wherein the connecting member extends between and operably connects the drive roller and flange together so that operation of the motor rotationally drives both the drive roller and flange to drive both the resurfacing belt and disc through their respective operating motions;
- a first adjustment guide system comprising a base plate, a guide plate positioned and laterally sliding on the base plate, a lateral guide rail slidingly engaged between the base plate and the guide plate to guide the lateral sliding of the guide plate on the base plate, and a first offset guide rail extending upwardly from the guide plate and perpendicularly to the resurfacing belt, wherein the offset guide rail supports and guides the chuck to enable the metallic watch component on the chuck to be positioned offset relative to the resurfacing belt during use, and wherein the lateral guide rail enables the metallic watch component on the chuck to be positioned laterally relative to the resurfacing belt during use;
- a second adjustment guide system comprising a second offset guide rail extending perpendicularly to the resurfacing disc, wherein the second offset guide rail supports and guides the chuck to enable the metallic watch component on the chuck to be positioned offset relative to the second resurfacing element during use; and
- a frame to which the first linear belt resurfacing system, the second rotary disc resurfacing system, the first adjustment guide system, the second adjustment guide system, and the common drive system are mounted, wherein the frame comprises a guide opening that removably receives the second offset guide rail during use, wherein the second offset guide rail is removably mounted to the frame so that it can be installed into the guide opening during use and removed from the guide opening when not in use to provide clearance and avoid being an obstruction.

17. The watch resurfacing device of claim 16, wherein the chuck has feet, wherein the first offset guide rail is fixedly mounted to the laterally sliding guide plate, has the shape of a partial cylinder, and is configured to be received between chuck feet, wherein the chuck feet contact the laterally sliding guide plate to prevent the chuck from being angularly repositioned about the first offset guide rail.

18. The watch resurfacing device of claim 16, wherein the first adjustment guide system further comprises multiple channels into which the lateral guide rail can be received, wherein the laterally sliding guide plate can be repositioned on the base plate closer to or farther from the resurfacing element.

19. The watch resurfacing device of claim 16, wherein the motor comprises a rotary output shaft, the common drive system further includes a linkage operably connecting the motor output shaft and the drive flange, the linkage is looped around the actuator output shaft and the drive flange, and the second offset guide rail extends through the looped linkage and into the guide opening during use.

20. A method of resurfacing a metallic watch component using the watch resurfacing device of claim 16, the method comprising:
- positioning the chuck holding the metallic watch component onto the first offset guide rail;
- offset adjusting the chuck along the first offset guide rail to closer to the resurfacing belt until the metallic watch component contacts the resurfacing belt to resurface the metallic watch component;
- laterally adjusting the chuck along the lateral guide rail the metallic watch component contacts another portion of the resurfacing belt to resurface the metallic watch component;
- repositioning the chuck holding the metallic watch component onto the second offset guide rail;
- removing the magnetically adhered resurfacing disc from the rotary disc resurfacing system by applying a separation force sufficient to overcome the magnetic attraction forces of the magnetic back layer to the metal mounting disc, and installing another magnetically adhered resurfacing disc onto the metal mounting disc; and
- offset adjusting the chuck along the second offset guide rail to closer to the resurfacing belt until the metallic watch component contacts the resurfacing disc to resurface the metallic watch component.

* * * * *